US012405666B1

(12) United States Patent
Mackellar et al.

(10) Patent No.: US 12,405,666 B1
(45) Date of Patent: Sep. 2, 2025

(54) SYSTEM AND METHOD FOR BIOSIGNAL DATA TRANSFORMATION

(71) Applicant: Emotiv Inc., San Francisco, CA (US)

(72) Inventors: Geoffrey Ross Mackellar, San Francisco, CA (US); Soheila GhaneEzabadi, San Francisco, CA (US); Tan Le, San Francisco, CA (US)

(73) Assignee: Emotiv Inc., San Francisco, CA (US)

( * ) Notice: Subject to any disclaimer, the term of this patent is extended or adjusted under 35 U.S.C. 154(b) by 0 days.

(21) Appl. No.: 18/988,483

(22) Filed: Dec. 19, 2024

Related U.S. Application Data

(60) Provisional application No. 63/664,473, filed on Jun. 26, 2024, provisional application No. 63/612,252, filed on Dec. 19, 2023.

(51) Int. Cl.
*G06F 17/40* (2006.01)
*G06F 3/01* (2006.01)

(52) U.S. Cl.
CPC ............. *G06F 3/015* (2013.01); *G06F 17/40* (2013.01)

(58) Field of Classification Search
CPC .................... G06F 3/015; G06F 17/40
See application file for complete search history.

(56) References Cited

U.S. PATENT DOCUMENTS

| 2007/0173733 | A1 | 7/2007 | Le et al. | |
|---|---|---|---|---|
| 2010/0280579 | A1* | 11/2010 | Denison | G16H 50/30 607/62 |
| 2011/0245629 | A1* | 10/2011 | Giftakis | A61B 5/1116 600/301 |
| 2022/0155867 | A1* | 5/2022 | Connor | G02C 5/14 |
| 2023/0225659 | A1 | 7/2023 | Azemi et al. | |

OTHER PUBLICATIONS

Foumani, Navid Mohammadi, et al., "EEG2Rep: Enhancing Self-supervised EEG Representation Through Informative Masked Inputs", arXiv:2402.1777v2, Jun. 18, 2024.

* cited by examiner

*Primary Examiner* — Phuong H Nguyen
(74) *Attorney, Agent, or Firm* — Jeffrey Schox; Annabel Imbrie-Moore

(57) ABSTRACT

A method for biosignal data transformation can include: determining a set of biosignal data, determining a brain state representation (e.g., an embedding) based on the biosignal data, and determining a biomarker value based on the brain state representation. The method can optionally include training a model (e.g., training a model used to determine the brain state representation), and/or any other suitable steps. A system for biosignal data transformation can include a biosignal device and a computing system.

20 Claims, 9 Drawing Sheets

SYSTEM AND METHOD FOR BIOSIGNAL DATA TRANSFORMATION

CROSS-REFERENCE TO RELATED APPLICATIONS

This application claims the benefit of U.S. Provisional Application No. 63/664,473 filed 26 Jun. 2024, and U.S. Provisional Application No. 63/612,252 filed 19 Dec. 2023, each of which is incorporated in its entirety by this reference.

TECHNICAL FIELD

This invention relates generally to the biosignal data analysis field, and more specifically to a new and useful system and method in the biosignal data analysis field.

DETAILED DESCRIPTION

The following description of the embodiments of the invention is not intended to limit the invention to these embodiments, but rather to enable any person skilled in the art to make and use this invention.

1. Overview

Figure 1:
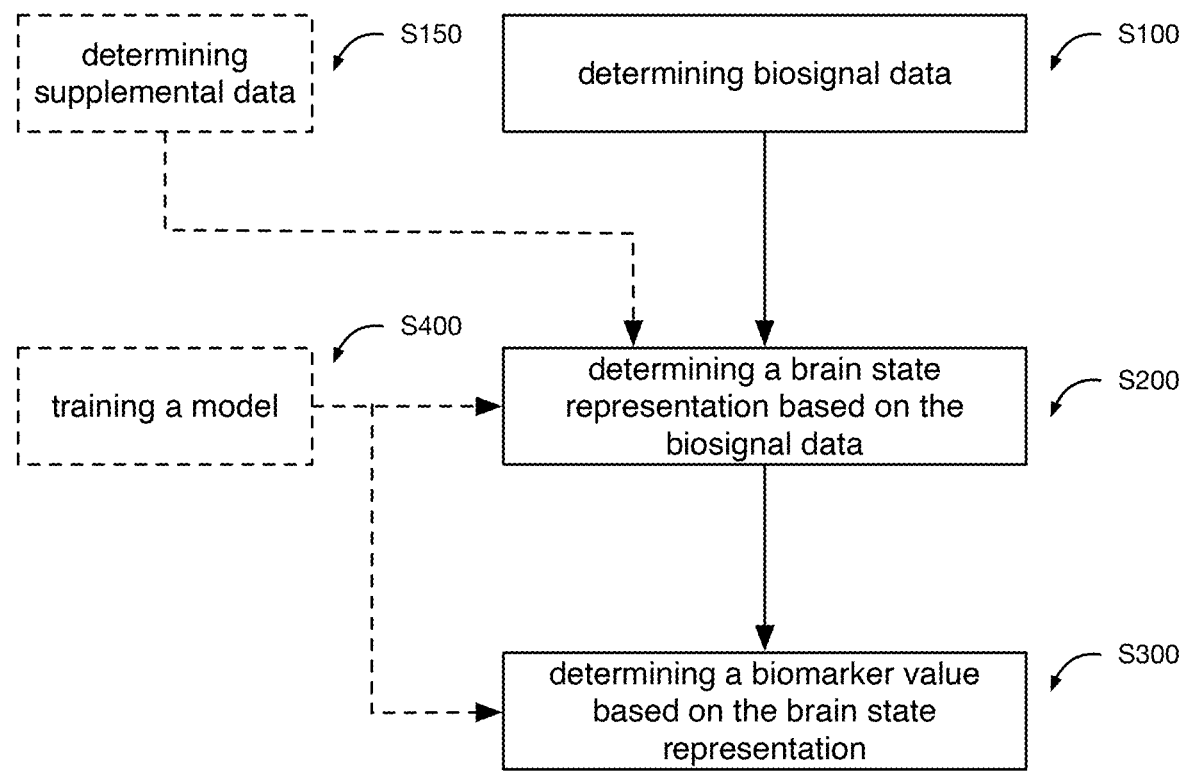
FIG. 1 is a schematic representation of a variant of the method.

As shown in FIG. 1, the method can include: determining biosignal data S100, determining a brain state representation based on the biosignal data S200, and determining a biomarker value based on the brain state representation S300. The method can optionally include determining supplemental data S150 and/or training a model S400. However, the method can additionally or alternatively include any other suitable steps.

Figure 2:
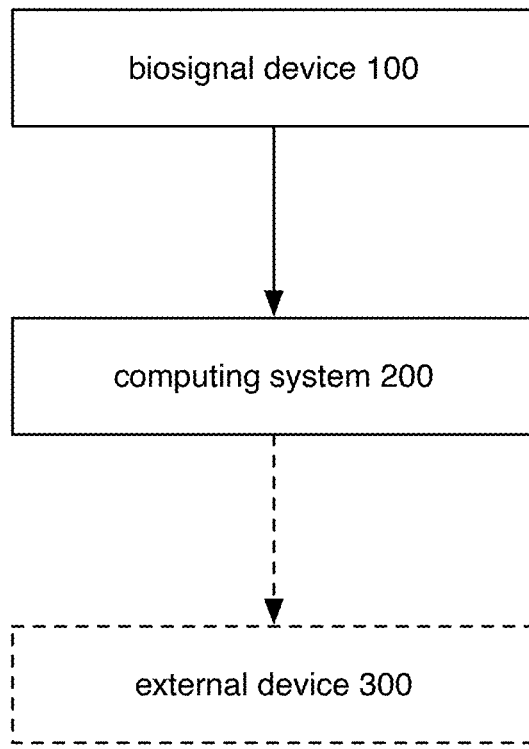
FIG. 2 is a schematic representation of a variant of the system.

As shown in FIG. 2, the system can include: a biosignal device 100 and a computing system 200. However, the system can additionally or alternatively include any other suitable components.

In variants, the system and/or method function to collect and transform neurological biosignals into an embedding for determining a brain state of a user. In a specific example, the system and/or method can function to map a personal brain state based on a user's collected biosignal data to a generic brain state.

2. Examples

In an example, biosignal data (e.g., EEG data, MEG data, etc.) can be collected from a user via a biosignal device (e.g., a headset). The biosignal data can optionally be transformed into an input embedding that encodes the biosignal data and device information (e.g., channel count, sensor positioning, etc.). In an example, the input embedding can then be transformed into a brain state embedding (e.g., a "Canonical" representation of the brain state) using a representation model (e.g., an encoder, a foundation model, etc.). In a specific example, the brain state embedding can be segmented into a beneficial segment and one or more non-beneficial segments (e.g., a neutral segment and/or an adversarial segment), wherein the beneficial segment can optionally be further segmented into one or more biomarker-specific segments. In an illustrative example, a first segment of the beneficial segment of the brain state representation is relevant to focus level, and a second segment of the beneficial segment is relevant to mental commands. In an example, one or more segments from the brain state embedding (e.g., a biomarker-specific segment) can be selected and used to predict a biomarker value for the user. Specific examples of biomarkers values for a user include: mental command, text, image, emotional state, attention level, neurological disorder state, perceived and/or intended speech, sleep state, depth of anaesthesia, fatigue, cognitive state, mental capacities (e.g., learning, memory, familiarity, computation, creativity, etc.), connectivity, sensory and/or motor disorder states, development and decline of capacities, prediction of future conditions or events, preferences, intentions, and/or any other neurological states.

3. Technical Advantages

Variants of the technology can confer one or more advantages over conventional technologies.

First, variants of the technology can generate a brain state representation (e.g., embedding) from biosignal data (e.g., EEG data, MEG data, etc.), which can: reduce dimensions of the biosignal data (e.g., thereby increasing computational efficiency), surface relevant features of the biosignal data (e.g., features relevant to the neurological state as a whole, relevant to a specific biomarker of interest, etc.), reduce artifacts and/or any other adversarial features (e.g., noise, intrinsic non-brain signals, distortions due to inter-subject and/or intra-subject differences, distortions due to variations related to the biosignal device, etc.), standardize across users, and/or standardize across devices (e.g., across different channel counts, across different sensor positions, across different biosignal device placements, etc.). In a specific example, the brain state representation can be a "Canonical" embedding, approximating a "Universal" embedding that represents an idealized and/or standardized brain model. In an example, the same representation model (e.g., a trained foundation model, an encoder, etc.) can be used to determine a biomarker value based on biosignal data collected using a first biosignal device (e.g., with a first number of channels), and to determine a biomarker value based on biosignal data collected using a second biosignal device (e.g., with a second number of channels). In another example, the brain state representation (e.g., the canonical representation of the idealized brain) can be used as an efficient basis to develop accurate downstream biomarker models for any measurable condition, where the brain state representation can be trained using supervised and self-supervised methods with an extremely large set of data from a very large number of diverse subjects using one or more known device configurations (e.g., learning to separate subject-, device- and noise-related signal variations from brain-related signals) and to subsequently apply the model to predict the same set of biomarkers using data collected with the same device(s) and/or other device configurations (e.g., with minimal fine tuning) for unseen subjects. The range of training subjects can optionally include a diversity of healthy and unhealthy subjects, clinical datasets, partially labeled, representing a range of demographically and neurologically diverse groups, including a significant longitudinal component. A subset may be collected in conjunction with other biosignal devices and/or contextual information (e.g., driving, watching a movie, reading, listening to music, working etc.). In another example, variants of the technology can segment the brain state representation into beneficial and non-beneficial (e.g., neutral, adversarial, etc.) segments, wherein only the beneficial segment or a subset thereof (e.g., a biomarker-specific segment within the beneficial segment) is used to determine a biomarker value. In variants, this can increase computational efficiency by reducing the amount of data used to infer the biomarker value. In a specific example, this increase in computational efficiency can enable the biomarker value to be determined in real time with collecting biosignal data.

Second, variants of the technology can leverage a biosignal device (e.g., an EEG neuroheadset) to infer (e.g., predict) mental commands from a user, wherein the inferred mental commands can optionally be used to control an external device. For example, biosignal data can be collected while a user wearing a biosignal device is thinking of a mental command; the mental command can then be inferred based on the biosignal data (e.g., based on a brain state representation determined from the biosignal data) and used to control a device (e.g., user device, phone, laptop, robotic system, etc.). Examples of controlling an external device can include: physically actuating a mechanism communicably connected to the bioelectrical monitoring device; executing a digital output (e.g., controlling smart lights or other connected systems; digitally manipulating a digital asset, such as an avatar; etc.); and/or otherwise controlling an external device.

However, further advantages can be provided by the system and method disclosed herein.

4. System

Figure 3:
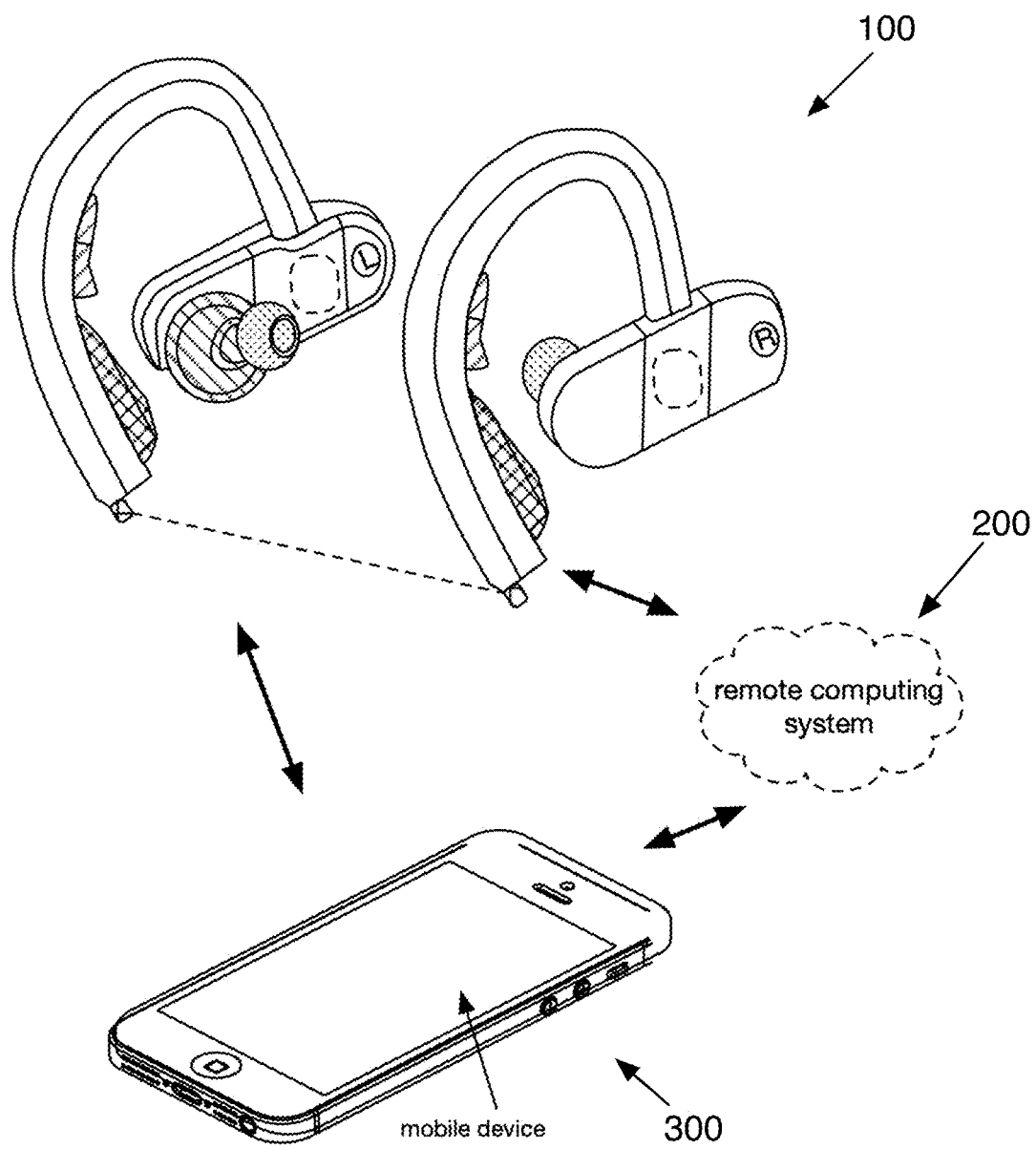
FIG. 3 depicts a specific example of the system.

As shown in FIG. 2, the system can include: a biosignal device 100 and a computing system 200. The system can optionally include: a database, an external device (e.g., a user device), a supplemental sensor, and/or any other suitable components. A specific example of the system is shown in FIG. 3.

The system can include one or more biosignal devices configured to collect biosignal data from one or more users. In a first example, the system can include one or more biosignal devices for a single user. In a second example, the system can include one or more biosignal devices for each user in a set of multiple users (e.g., at least 2 users, at least 5 users, at least 10 users, at least 100 users, at least 1000 users, at least 100000 users, etc.). Examples of form factors of the biosignal device 100 can include: headphones, earbuds, glasses, helmets, caps, a headset, and/or any other suitable form factor.

A biosignal device 100 can include a set of sensors (e.g., electrodes) configured to collect biosignal data from a user. The set of sensors can be configured to detect any one or more of: EEG signals, EOG signals, EMG signals, ECG signals, GSR signals, MEG signals, EcoG signals, iEEG signals, Stentrode signals, any electromagnetic signals, and/or any other suitable biosignals. In an example, the set of sensors can include electrodes (e.g., active electrodes and/or reference electrodes) configured to collect bioelectrical data from a user. In a specific example, the set of sensors (e.g., EEG sensors) can include one or more active electrodes (e.g., channels), one or more reference electrodes, and/or any other type of electrode. The number of sensors in the set of sensors of a biosignal device 100 (e.g., the channel count) can be between 1-100,000 or any range or value therebetween (e.g., 1, 2, 3, 4, 5, 6, 7, 8, 9, 10, 12, 13, 14, 15, greater than 15, at least 100, etc.). In a specific example, the biosignal device 100 can include: 2 channels, 5 channels, 14 channels, 18 channels, 32 channels, 256 channels, and/or any other number of channels (e.g., where a channel corresponds to an active electrode). A sensor can be positioned at a location on the user (e.g., a location on the head of the user). Examples of sensor locations in or on a head of a user (e.g., on the surface of the skin, implanted within the skin, on the surface of the brain, implanted within the brain, etc.) can include: an ear region (e.g., left or right: ear canal region, mastoid, earlobe, etc.), left side of the head, right side of the head, temple, forehead, parietal ridge, temporal lobe region, frontal lobe region, parietal lobe region, occipital lobe region, frontal region (e.g., Fz, Fp1, Fp2, F3, F4, F7, F8, etc.), central region (e.g., Cz, C3, C4, etc.), parietal region (e.g., Pz, P3, P4, P7, P8, etc.), occipital region (e.g., Oz, O1, O2, etc.), temporal region (e.g., T7, T8, etc.), and/or any suitable anatomical location of the user. The biosignal device 100 can sample biosignal data at a frequency between 0.1 Hz-10000 Hz or any range or value therebetween. However, the biosignal device 100 can include any suitable configuration of a set sensors.

Biosignal devices (e.g., for a single user and/or across different users) can be identical (e.g., the same channel count, the same sensor positioning, the same sensor type, the same form factor, the same measurement frequency, etc.) or different (e.g., different channel counts, different sensor positionings, different sensor types, different form factors, different measurement frequencies, a combination thereof, etc.). In a first example, a first biosignal device can have a different number of sensors (e.g., EEG sensors) than a second biosignal device. In a specific example, a first biosignal device 100 (e.g., configured to receive biosignals from a first user) has a first number of sensors and a second biosignal device (e.g., configured to receive biosignals from the first user and/or configured to receive biosignals from a second user) has a second number of sensors, greater than the first number of EEG sensors. In an illustrative example, the first biosignal device has less than 10 sensors and the second biosignal device has greater than 10 sensors. In a second example, a first biosignal device can have a different number of a specific type of sensor (e.g., active electrodes, reference electrodes, etc.). In an illustrative example, the first biosignal device is a 2 channel system (e.g., the first biosignal device includes 2 active electrodes) and a second biosignal device is a 14 channel system (e.g., the second biosignal device includes 14 active electrodes). In another illustrative example, the first biosignal device includes 1 reference electrode and a second biosignal device includes at least 2 reference electrodes. In a third example, a first biosignal device can have a different sensor positioning than a second biosignal device. In a specific example, a first biosignal device has a sensor positioned at a first location on a user (e.g., a first location on the head of the user), wherein a second biosignal device does not have a sensor positioned at the first location on a user (e.g., the same user or a different user). In an illustrative example, a first biosignal device has a sensor positioned at an ear region of a user (e.g., an ear canal region), and a second biosignal device does not have a sensor positioned at an ear region of a user. In another illustrative example, a first biosignal device has a sensor positioned behind an ear of a user, and a second biosignal device does not have a sensor positioned behind an ear of a user. In a fourth example, a first biosignal device can sample biosignal data at a different (e.g., greater) measurement frequency than a second biosignal device.

The biosignal device 100 optionally include: an onboard computing system, a communication module (e.g., an electronics subsystem communicatively connecting the sensors to the computing system 200), an input (e.g., keyboard, touchscreen, etc.), an output (e.g., a display), supplemental sensors (e.g., as described below), and/or any other suitable component.

Additionally or alternatively, the biosignal device 100 can include any components described in U.S. patent application Ser. No. 18/625,638 filed 3 Apr. 2024, U.S. application Ser. No. 15/970,583 filed 3 May 2018, U.S. application Ser. No. 18/386,907 filed 3 Nov. 2023, and U.S. patent application Ser. No. 18/375,201 filed 29 Sep. 2023, each of which are herein incorporated in their entirety by this reference.

However, the biosignal device(s) can be otherwise configured.

The system can optionally include one or more supplemental sensors. Specific examples of supplemental sensors can include: motion sensor (e.g., inertial measurement unit), magnetometer, audio sensor (e.g., microphone), camera, location sensor, light sensor (e.g., spectroscopy sensor), electrode (e.g., electrocardiogram electrode), MRI machine, CT machine, impedance sensor, blood pressure sensor, heart rate sensor, respiration rate sensor, chemical sensor, and/or any other sensors. However, the supplemental sensor(s) can be otherwise configured.

The system can optionally include one or more external devices. Specific examples of external devices include: smartwatch, smartphone, a wearable computing device (e.g., head-mounted wearable computing device), tablet, desktop, a medical device, a robotic system (e.g., a robotic prosthetic), any user device, and/or any other suitable device. External device components can include an input (e.g., keyboard, touchscreen, etc.), an output (e.g., a display), an onboard computing system, a communication module (e.g., an electronics subsystem communicatively connecting the external device to the computing system 200), and/or any other suitable component.

However, the external device(s) can be otherwise configured.

The system can optionally include or interface with one or more databases (e.g., a system database, a third-party database, etc.). In a first example, the system can include a user database. In specific examples, the user database can store user account information, user profiles, user health records, user demographic information, associated user devices, user preferences, and/or any other user information. In a second example, the system can include an analysis database. In specific examples, the analysis database can store computational models, collected datasets, historical data, public data, simulated data, generated data, generated analyses, diagnostic results, therapy recommendations, and/or any other analysis information. In a third example, the system can include a device database. In specific examples, the device database can store device information for one or more biosignal devices, such as: number of sensors (e.g., channel count), sensor positioning information, sensor type (e.g., for each sensor in the set of sensors), measurement frequency, and/or any other device information. However, the database(s) can be otherwise configured.

The computing system 200 can include one or more: CPUs, GPUs, TPUs, custom FPGA/ASICS, microprocessors, servers, cloud computing, and/or any other suitable components. The computing system 200 can be local (e.g., local to the biosignal device, local to a user device, etc.), remote (e.g., cloud computing server, etc.), distributed, and/or otherwise arranged relative to any other system or module.

Communication between system components can include wireless communication (e.g., WiFi, Bluetooth, radiofrequency, etc.) and/or wired communication. In variations, a biosignal device 100 (e.g., an electronics subsystem of a biosignal device) can be communicatively connected to the computing system 200 (e.g., a processing system) executing a software component.

The system (e.g., the computing system 200) can implement one or more models. The models can use classical or traditional approaches, machine learning approaches, and/or be otherwise configured. The models can use or include regression (e.g., linear regression, non-linear regression, logistic regression, etc.), decision tree, clustering, association rules, dimensionality reduction (e.g., PCA, t-SNE, LDA, etc.), language processing techniques (e.g., LSA), neural networks (e.g., GNN, CNN, DNN, CAN, LSTM, RNN, FNN, encoders, decoders, deep learning models, transformers, state-space models, joint representation learning models, reservoir models, etc.), ensemble methods, optimization methods (e.g., Bayesian optimization), classification, rules, heuristics, equations (e.g., weighted equations, etc.), selection (e.g., from a library), lookups, regularization methods (e.g., ridge regression), Bayesian methods (e.g., Naiive Bayes, Markov, etc.), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, foundation models (e.g., language models), and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. In a specific example, models can be trained using adversarial training, non-adversarial training (e.g., beneficial training), and/or a combination thereof. The models can be learned or trained on: labeled data (e.g., data labeled with the target label), unlabeled data, positive training sets (e.g., a set of data with true positive labels), negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the system can be otherwise configured

5. Method

As shown in FIG. 1, the method can include: determining biosignal data S100, determining a brain state representation based on the biosignal data S200, and determining a biomarker value based on the brain state representation S300. The method can optionally include determining supplemental data S150, training a model S400, and/or any other suitable steps.

The method can be performed one or more times for each of a set of users, one or more times for each of a set of training datasets, one or more times for each of a set of biomarkers, and/or at any other time. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

All or portions of the method can be performed by one or more components of the system, using a computing system, using a database (e.g., a system database, a third-party database, etc.), user interface, by a user, and/or by any other suitable system.

5.1. Determining Biosignal Data S100

The method can include determining biosignal data S100, which functions to collect measurements of a user's brain. In an example, biosignal data collected for a user can be used to determine a biomarker value for that user. In another example, biosignal data collected for a user (e.g., a training user) can be used to train a model (e.g., an encoder). S100 can be performed one or more times for a user, one or more times for each user in a set of users, and/or otherwise performed. S100 can be performed before S200, before S400, and/or at any other time.

Biosignal data can include: electrical data (e.g., bioelectrical data), magnetic data, electromagnetic data, and/or any other type of data. The biosignal data preferably includes measurements of a brain (e.g., neural signals), but can additionally or alternatively include measurements of a heart, skin, and/or any other physiological measurements. Specific examples of biosignal data include: EEG signals, EOG signals, EMG signals, ECG signals, GSR signals, MEG signals, EcoG signals, iEEG signals, Stentrode signals, any electromagnetic signals, motion signals (e.g., from the head and/or other body parts), audio signals, and/or any other suitable biosignals. In an illustrative example, the biosignal data can include measurements of the movement of electrical charges within and/or between neurons within the human brain and/or sensory system. In specific examples, the biosignal data can include measurements of changes in the electric field at one or more sensing positions, such as: the scalp (e.g., EEG measurements of skin surface potentials across the scalp), subcutaneously and/or on the surface of the brain (e.g., EcoG), at locations distributed within the brain (e.g., intracranial—iEEG, vascular—Stentrode, etc.), and/or any other sensing positions. In other specific examples, the biosignal data can include measurements of changes in the magnetic field at one or more sensing positions, generated by the movement of electrical charges (MEG) and/or by a combination of electrical and magnetic measurements.

The biosignal data is preferably measured via the biosignal device 100, but can alternatively be otherwise determined. In a specific example, the biosignal data can include bioelectrical data measured using a set of electrodes (e.g., active electrodes and/or reference electrodes) of a biosignal device 100.

Biosignal data can optionally include unlabeled data and/or labeled data. In a specific example, labeled data can include biosignal data labeled with a biomarker value (e.g., a known neurological state). In an illustrative example, the labeled data can include biosignal data collected during a period of time during which a user (e.g., subject) was experiencing known stimuli (e.g., tasks) and/or was experiencing a known neurological state (e.g., determined by self-report, measured using a supplemental sensor, retrieved from a database, etc.).

The method can optionally include processing the biosignal data. As used herein, the biosignal data can refer to unprocessed or processed biosignal data. In a first variant, processing the biosignal data can include removing artifacts from the biosignal data. Examples of artifact removal methods include: filtering methods, independent component analysis (ICA), Riemannian artifact subspace reconstruction (rASR), and/or any other suitable data cleaning methods. In specific examples, artifacts can represent noise, muscle signals (e.g., blinking, smiling, frowning, walking, etc.), heart rate information, and/or any other artifacts. In a second variant, processing the biosignal data can include referencing data from one or more active electrodes using data received from one or more reference electrodes. Additionally or alternatively, processing the biosignal data can include: filtering, normalizing, extracting features, transforming, aggregating, statistical analysis, downsampling, fitting, smoothing, denoising, masking, and/or any other processing methods. Additionally or alternatively, processing the biosignal data can use methods described in U.S. patent application Ser. No. 18/625,638 filed 3 Apr. 2024, U.S. application Ser. No. 15/970,583 filed 3 May 2018, U.S. application Ser. No. 18/386,907 filed 3 Nov. 2023, and U.S. patent application Ser. No. 18/375,201 filed 29 Sep. 2023, each of which are herein incorporated in their entirety by this reference. However, the biosignal data can be otherwise processed.

However, biosignal data can be otherwise determined.

5.2. Determining Supplemental Data S150

The method can optionally include determining supplemental data S150, which functions to collect additional information for the user. For example, the supplemental data can be used in combination with the biosignal data to: encode the biosignal data into a device-agnostic brain state representation and/or to improve the accuracy of inferring a biomarker value. S150 can be performed before S100, after S100, concurrently with S100, and/or at any other time.

Specific examples of supplemental data include: images (e.g., MRI images, fMRI images, dMRI images, CT images, FNIRS images, etc.), motion data (e.g., head and/or body movements, biosignal device motion, etc.), heart rate and/or variability, respiration rate, audio data (e.g., recorded user speech, recorded environment sounds, other audible signals, etc.), user inputs (e.g., self-reported parameters), demographic information (e.g., age, gender, handedness, educational level, multilingual skills, musical skills, disease state, location, etc.), metadata (e.g., location, date, time of day, etc.), medical history, eye tracking, pupil dilation, skin surface impedance, detection of chemical markers (e.g., in blood, saliva, perspiration, interstitial fluid, etc.), muscle tension, voice stress, semantic analysis of spoken and/or written language, location, context, response to stimuli (e.g., controlled stimuli), device information, features extracted thereof, and/or any other supplemental data. Supplemental data can be measured using one or more supplemental sensors, input via a user device (e.g., manual user inputs), retrieved from a database (e.g., from an electronic medical records database, from a device database, etc.), determined based on other supplemental data (e.g., features extracted from measurements), manually determined, a combination thereof, and/or otherwise determined. Examples of device information include: number of sensors (e.g., channel count), sensor positioning (e.g., sensor location for each sensor in the set of sensors), sensor type (e.g., for each sensor in the set of sensors), measurement frequency, contact impedance, and/or any other device information. The supplemental data can optionally include non-identifying data and/or identifying data. The supplemental data can optionally include sufficient data to indicate that the biosignal data for a user includes biosignal data generated on different occasions by the same individual.

In a first specific example, the supplemental data can include neural measurements (e.g., measurements of indirect effects of brain activity such as local depletion of oxygenated blood as the neurons become active within functional regions). In a second specific example, the supplemental data can include measurements of relevant parameters for determining mental state, intention, and/or behavior of a user. In a third specific example, the supplemental data can include a user response to a stimulus, wherein the user response can optionally be used to determine a training label for corresponding biosignal data collected for the user. In a fourth specific example, the supplemental data can include device information for the device used to collect the biosignal data. In a first illustrative example, the supplemental data can include a channel count (e.g., 2 channel, 14 channel, etc.) of the biosignal device 100. In a second illustrative example, the supplemental data can include a sensor position for each of the set of sensors (e.g., channel 1 corresponds to a F7 position, channel 2 corresponds to a T7 position, etc.).

However, supplemental data can be otherwise determined.

5.3. Determining a Brain State Representation Based on the Biosignal Data S200

The method can include determining a brain state representation based on the biosignal data S200, which functions to transform the biosignal data into an embedding. This transformation can function to: reduce dimensions (e.g., which can increase computational efficiency), surface relevant features of the biosignal data (e.g., relevant to the neurological state as a whole, relevant to a specific biomarker of interest, etc.), and/or standardize the representation of the neurological state across users and/or across devices (e.g., across different channel counts, across different sensor positions, etc.). However, this transformation can otherwise function to facilitate determining biomarker value(s) for one or more users from the biosignal data.

The brain state representation is preferably an embedding within a latent space (e.g., a learned latent space), but can additionally or alternatively be any other representation of the biosignal data. In an example, the brain state representation can transform the neurological state of a user to a standardized human brain (e.g., the learned latent space of the representation model). In a specific example, the brain state representation can approximate a universal representation (e.g., the brain state representation can be a canonical representation, as described below).

Figure 6:
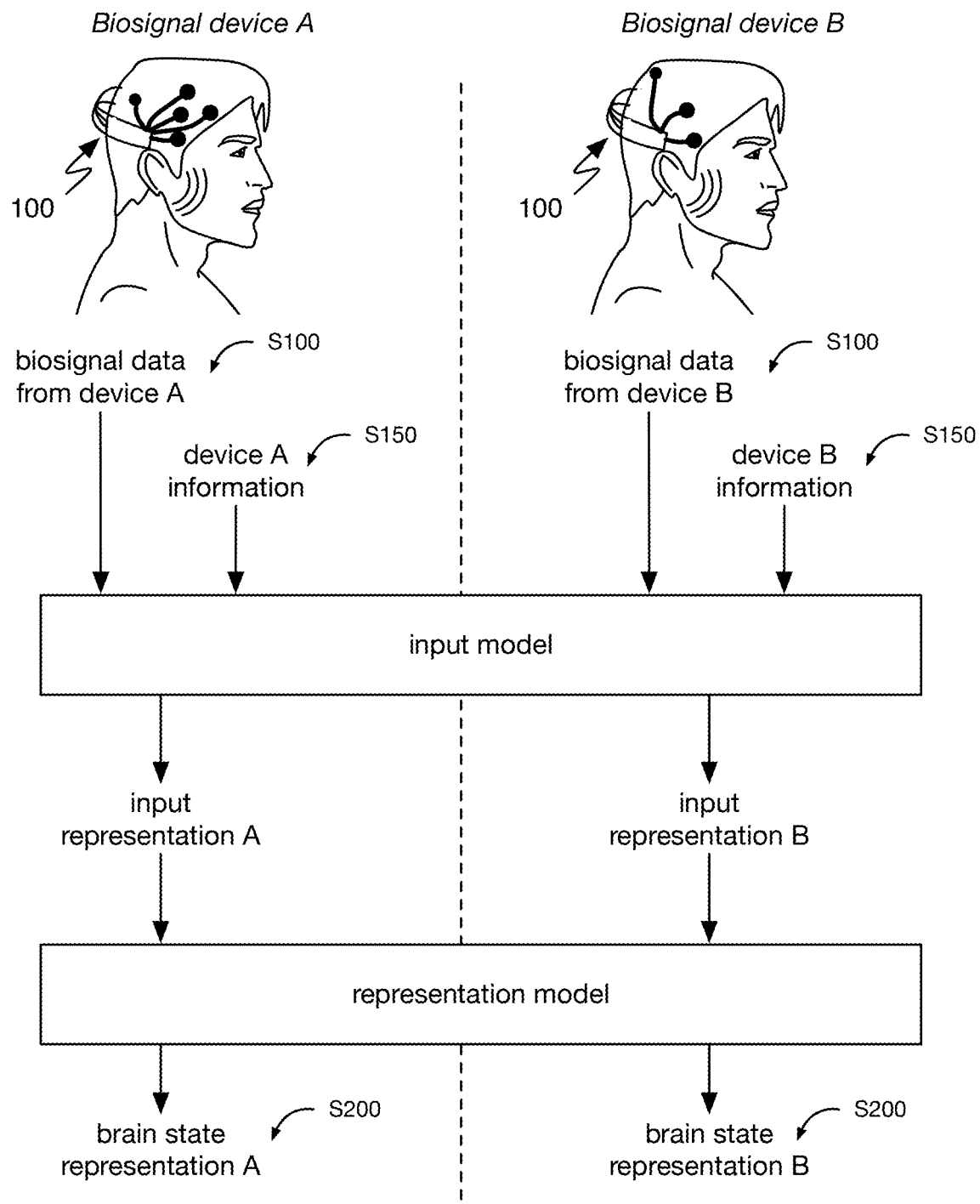
FIG. 6 depicts a specific example of the method, including using different biosignal devices (e.g., with different numbers of channels, with different sensor positioning, etc.).

S200 can optionally include determining an input representation based on the biosignal data, which can function to: reduce dimensions (e.g., which can increase computational efficiency), reduce artifacts, and/or standardize the representation of the neurological state across devices (e.g., across different channel counts, across different sensor positions, etc.). The input representation can optionally be used to determine the brain state representation. An example is shown in FIG. 6.

The input representation (e.g., an input embedding) can optionally be determined using an input model. The input model can be an encoder and/or any other suitable model. Inputs to the input model can include: biosignal data, supplemental data (e.g., device information), and/or any other suitable information. Outputs from the input model can include an input representation (e.g., input embedding). For example, the device information and the biosignal data can be transformed (e.g., separately encoded, jointly encoded, etc.) into the input representation. In an example, the device information (e.g., channel count, sensor positioning, etc.) can be encoded as a first segment (a device segment) of the input representation, and the biosignal data can be encoded as a second segment (a data segment) of the input representation. In a specific example, the device segment of the input representation can map subsegments of the data segment of the input representation to sensors (e.g., channels) of the biosignal device 100 and/or associated information thereof (e.g., sensor position). In a specific example, the input model may be configured as an ensemble (e.g., battery) of device-specific encoders that produces an input embedding based on the biosignal data (e.g., wherein the input embedding is presumed to be a common low-level representation of the biosignal data, independent of the specific device configuration). The input representation can optionally serve as the input layer for a downstream representation model. The input model can optionally be trained as described in S400.

However, the input representation can be otherwise determined.

The brain state representation can be determined based on the biosignal data, the input representation, supplemental data, and/or any other suitable information. The brain state representation can optionally be determined using a representation model. The representation model can be or include: a foundation model, an encoder, decoder (i.e., autoregressive model), autoencoder (i.e., encoder plus decoder), an ensemble of encoders (e.g., an ensemble of encoders including the input model; joint embedding predictive architecture (JEPA); etc.), generative (eg, GAN, diffusion), and/or any other suitable model. In specific examples, blocks inside an encoder and/or decoder can include: transformer blocks, RNN, CNN, LSTM, S4/Mamba, and/or any other suitable blocks. Inputs to the representation model can include: biosignal data, the input representation (e.g., input embedding), supplemental data, and/or any other suitable inputs. In a specific example, the only input to the representation model is the input representation. Outputs from the representation model can include all or a portion of a brain state representation for a user. The representation model can optionally be trained as described in S400. However, the brain state representation can be otherwise determined.

S200 can optionally include segmenting the brain state representation, which functions to: surface relevant portions of the brain state representation (e.g., relevant to the neurological state as a whole, relevant to a specific biomarker of interest, etc.) and/or reduce the size of the input to the biomarker model (e.g., to increase computational efficiency) . As used herein the "brain state representation" can refer to a complete brain state representation or a segment thereof.

Figure 4:
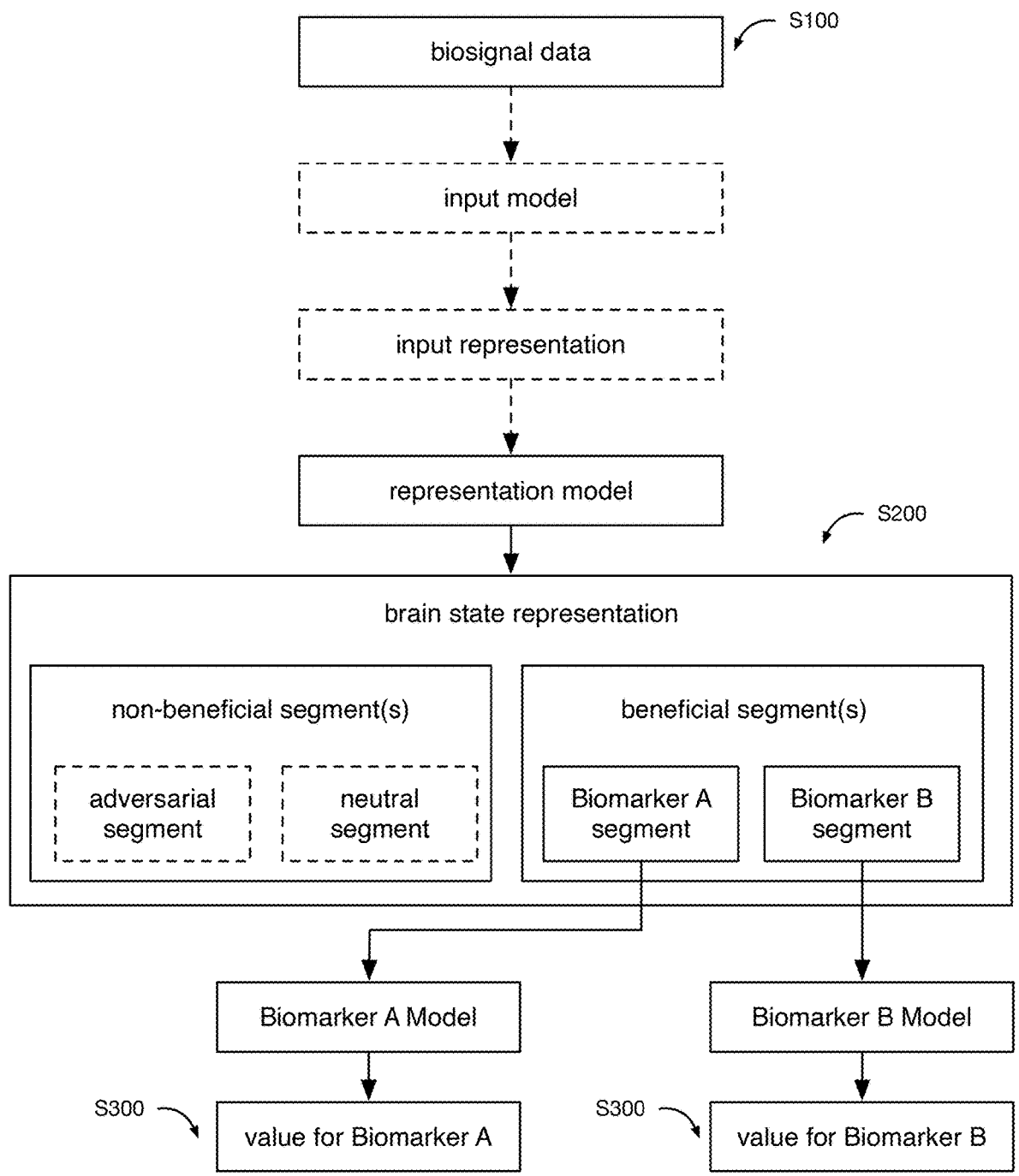
FIG. 4 depicts an example of the method, including segmenting a brain state representation.

The brain state representation can be segmented into a set of segments by the representation model (e.g., the representation model outputs a segmented brain state representation), by a separate model (e.g., a segmentation model), using a set of heuristics, and/or otherwise segmented. An example is shown in FIG. 4. A brain state representation segment can be a contiguous or noncontiguous subset of the brain state representation. The set of segments can include overlapping segments (e.g., a first segment can share underlying biosignal data with a second segment, a first segment can share a portion of the brain state representation with a second segment, etc.) or non-overlapping segments. In specific examples, the number of segments can be: at least 2, at least 5, at least 10, and/or any other suitable number of segments. However, the set of segments can alternatively include a single segment.

In a first variant, the set of segments includes a beneficial segment and a non-beneficial segment (e.g., an adversarial segment and/or a neutral segment). In an example, a beneficial segment can include a subset of the brain state representation that is beneficial in determining a biomarker value (e.g., the beneficial segment is relevant to the user's neurological state and/or a biomarker thereof). In a specific example, the beneficial segment can include a subset of the brain state representation that increases accuracy of determining a biomarker value (e.g., classification of the user's neurological state, etc.) based on the biosignal data. In another example, the adversarial segment (e.g., counterproductive segment) can include a subset of the brain state representation that is adversarial (e.g., counterproductive) to determining a biomarker value. In a specific example, the adversarial segment can include a subset of the brain state representation that decreases (e.g., confounds, diminishes, etc.) accuracy of determining a biomarker value (e.g., classification of the user's neurological state, etc.) based on the biosignal data. Illustrative examples of biosignal data features captured by the adversarial segment can include: noise, artifacts (e.g., due to blinks, facial expressions, eye orientation, speech-related muscles, etc.), anatomical differences, intrinsic non-brain signals, distortions due to inter-subject and/or intra-subject differences, distortions due to variations related to the biosignal device, and/or any other adversarial biosignal data features. In another example, a neutral segment can include a subset of the brain state representation that has no relevance to determining a biomarker value (e.g., no relevance to the user's neurological state and/or a biomarker thereof). Each subset of the brain state representation may be beneficial, adversarial or neutral in the determination of any biomarker value. For example, all or a portion of a beneficial segment for a first biomarker can optionally overlap with all or a portion of a non-beneficial segment for a second biomarker. In a second variant, the set of segments includes biomarker-specific segments. In a specific example, a first segment corresponds to a first biomarker (e.g., the first segment is used to determine a value for the first biomarker via S300) and a second segment (e.g., overlapping with the first segment and/or nonoverlapping with the first segment) corresponds to a second biomarker (e.g., the second segment is used to determine a value for the second biomarker via S300). In an illustrative example, a first segment of the brain state representation is relevant to focus level (e.g., relevant to inferring focus level via S300), and a second segment of the brain state representation is relevant mental commands (e.g., relevant to inferring mental commands via S300). In a third variant, a combination of the previous variants can be implemented. For example, the brain state representation can be segmented into a hierarchy of segments. In a specific example, a beneficial segment of the brain state representation can be further segmented into biomarker-specific segments. In another specific example, an adversarial segment of the brain state representation can be further segmented into artifact-specific segments. In illustrative example, the artifact-specific segments can include segments corresponding to: blinks, facial expressions, eye orientation, speech-related muscles, and/or any other artifacts. In another specific example, an adversarial segment of the brain state representation can be further segmented into a subset of the adversarial segment that corresponds to between-subject differences.

The segmentation is preferably learned during model training (e.g., as described in S400), but can be otherwise determined. In a specific example, the model training adjusts the brain state representation segmentation such that the beneficial segment is beneficial for predicting one or more biomarker values (e.g., minimizing the loss between a biomarker value determined using a beneficial segment and a training label), the neutral segment is neutral for predicting one or more biomarker values, and/or the adversarial segment (e.g., counterproductive segment) is adversarial (e.g., counterproductive) for predicting one or more biomarker values (e.g., maximizing the loss between a biomarker value determined using an adversarial segment and a training label). In another specific example, the model training adjusts the brain state representation segmentation such that a first biomarker segment is beneficial for predicting values for a first biomarker (e.g., minimizing the loss between a value determined using the first biomarker segment and a training label for the first biomarker) and a second biomarker segment is beneficial for predicting values for a second biomarker (e.g., minimizing the loss between a value determined using the second biomarker segment and a training label for the second biomarker). Learning the segmentation can optionally include adjusting (e.g., optimizing)

a size of each segment (e.g., as described in S400). In a specific example, the size (e.g., length) of the beneficial segment may be adjusted (e.g., optimized) by passing an initial segment to a biomarker model (e.g., a classifier for a biomarker), and iteratively increasing the size of the segment until no further improvement in accuracy of biomarker value determination is observed. In an illustrative example, the initial segment can be a small segment (e.g., 1, 2, 10, etc.) of features (e.g., subsets of the output representation). In another specific example, the size (e.g., length) of the beneficial segment may be adjusted (e.g., optimized) by passing an initial segment to a biomarker model (e.g., a classifier for a biomarker), and iteratively reducing (e.g., pruning) the size of the segment until the accuracy starts to diminish.

However, the brain state representation can be otherwise segmented.

S200 can optionally include selecting one or more segments of the brain state representation. For example, a selected segment of the brain state representation can be used to determine the biomarker value (e.g., S300). The segment(s) of the brain state representation can optionally be selected based on a biomarker of interest and a mapping between the set of embedding segments and a set of biomarkers. For example, when the set of segments includes biomarker-specific segments, a mapping between each biomarker-specific segment and the corresponding biomarker can be predetermined (e.g., set during training). In an illustrative example, a mapping relates a first segment of the brain state representation to focus level and a second segment of the brain state representation (e.g., overlapping or nonoverlapping with the first segment) to mental commands; the first segment of the brain state representation can be selected for determining a value for the focus level, and the second segment of the brain state representation can be selected for determining a value for mental commands. However, brain state representation segment(s) can be otherwise selected.

In a specific example, S300 can use models as described in: Navid Mohammadi Foumani, Geoffrey Mackellar, Soheila Ghane, Saad Irtza, Nam Nguyen, and Mahsa Salehi. 2024. EEG2Rep: Enhancing Self-supervised EEG Representation Through Informative Masked Inputs. In Proceedings of the 30th ACM SIGKDD Conference on Knowledge Discovery and Data Mining (KDD '24). Association for Computing Machinery, New York, NY, USA, 5544-5555. https://doi.org/10.1145/3637528.3671600, which is incorporated in its entirety by this reference. For example, the input model can be or use an input embedding. In another example, the representation model can be or use a context encoder.

However, the representation can be otherwise determined.

5.4. Determining a Biomarker Value Based on the Brain State Representation S300

The method can include determining a biomarker value based on the brain state representation S300, which functions to infer a state of the user from the brain state representation. The biomarker value can be used to: control an external device (e.g., open an application, close an application, display text, actuate a robotic system, play music, pause music, change music volume, etc.), administer a therapy, send a notification (e.g., to a doctor, to the user), identify a user, and/or for any other suitable use cases.

The biomarker can include a psychological status and/or physiological status. The biomarker is preferably a neurological biomarker (e.g., a neurological state), but can additionally or alternatively include a cardiovascular biomarker and/or any other biomarker for a user. Examples of neurological biomarkers include: mental state (e.g., cognitive state), emotional state (e.g., mood), mental performance, focus level (e.g., attention level), stress level, normal and/or abnormal neurological condition (e.g., epilepsy, Alzheimer's, Parkinson's, neurological deterioration, etc.), eye open and/or closed detection (e.g., blinking detection), response to stimuli, intent, behavior, mental command (e.g., a desired action, text, etc.), text (e.g., thoughts, words the user is reading, etc.), images (e.g., images the user is picturing), brain age, brain development, a comparison metric of the user's neurological state relative to a baseline (e.g., relative to a population baseline, relative to a user's own baseline, etc.), mental command, text, image, emotional state, attention level, neurological disorder state, perceived and/or intended speech, sleep state, depth of anaesthesia, fatigue, cognitive state, mental capacities (e.g., learning, memory, familiarity, computation, creativity, etc.), level of education, musical skill, recognition, connectivity, sensory and/or motor disorder states, sensory inputs, development and/or decline of capacities, prediction of future conditions and/or events, preferences, intentions, and/or any other neurological states. The biomarker value can be qualitative, quantitative, relative, discrete, continuous, a classification, numeric, binary, and/or be otherwise characterized.

Determining the biomarker value can optionally include passing the brain state representation to a biomarker model to output a value for the biomarker. Inputs to the biomarker model can include: the brain state representation (e.g., an embedding and/or segment thereof), supplemental data, and/or any other suitable inputs. The biomarker model can be a decoder (e.g., a trained decoder), a classifier, a foundation model, a combination thereof, and/or any other suitable model. For example, the biomarker model can decode the brain state representation into the biomarker value. The biomarker model can optionally be associated with a biomarker (e.g., the biomarker model is trained using benchmark studies corresponding to the biomarker). In an example, the biomarker model can be selected from a set of trained biomarker models based on a biomarker of interest. The biomarker model can optionally be associated with a specific user (e.g., the biomarker model is fine-tuned using training biosignal data collected for the specific user).

S300 can be performed one or more times for a user, one or more times for each of a set of users, and/or any other number of times. In a first variant, the method can include iteratively performing S300 for a given user across time (e.g., to determine a change in the biomarker over time). In a second variant, the method can include determining a value for each of a set of biomarkers for a given user. For example, the method can include: for a first biomarker, determining a first brain state representation (e.g., a first segment of a brain state representation) based on biosignal data collected for a user and the first biomarker (e.g., a mapping of mapping between brain state representation segments and the biomarkers); for a second biomarker, determining a second brain state representation (e.g., a second segment of the brain state representation) based on the biosignal data and the second biomarker; and determining a value for the first biomarker based on the first brain state representation (e.g., using a first biomarker model) and determining a value for the second biomarker based on the second brain state representation (e.g., using a second biomarker model). In a third variant, the method can include performing S300 one or more times for each user in a set of users. In a specific example, S300 can be performed for a first user using a first biosignal device (e.g., with a first number of sensors, with a first sensor positioning, etc.), and performed for a second user using a second biosignal device (e.g., with a second number of sensors, with a second sensor positioning, etc.).

In a specific example, the biomarker model can use models as described in: Navid Mohammadi Foumani, Geoffrey Mackellar, Soheila Ghane, Saad Irtza, Nam Nguyen, and Mahsa Salehi. 2024. EEG2Rep: Enhancing Self-supervised EEG Representation Through Informative Masked Inputs. In Proceedings of the 30th ACM SIGKDD Conference on Knowledge Discovery and Data Mining (KDD '24). Association for Computing Machinery, New York, NY, USA, 5544-5555. https://doi.org/10.1145/3637528.3671600, which is incorporated in its entirety by this reference. For example, the biomarker model can be or use a predictor network.

Determining a biomarker value based on the brain state representation can optionally include determining a brain age of a user at a time of biosignal data collection (e.g., the biomarker value is brain age). For example, the biomarker model can be a neural network (e.g., a brain age neural network) trained to predict a brain age of a user in years at the time of biosignal data collection. In example embodiments, S300 can include tracking several brain ages corresponding to the user at multiple times of biosignal data recording, where each of the times of biosignal data recording may be separate from one another. In example embodiments, S300 can include passing the biosignal data (e.g., in the canonical use case, for example at two seconds at 128 hertz (Hz) multiplied by 14 channels, or if it is from a two-channel device, from the two channels through the 14 channel EEG) through a neural network embedding to determine a number of activations, wherein the number of activations can optionally be used to determine the brain age.

In example embodiments, S300 can include displaying to the user a minimum brain age (e.g., 18 years old), rather than the actual determined brain age of the user, if the brain age may be lower than the minimum brain age.

In an example, S300 can include correlating the brain age of the user to one or more activities performed by the user, demographics of the user, hormonal cycles of the user, physiological cycles of the user, and/or medications taken by the user. Specific examples of activities performed by the user may include one or more mental activities and physical activities. Specific examples of mental activities may include, for example, mental tasks (e.g., puzzles, mentally intensive labor, strategy games, etc.) and/or a lack of mental tasks (e.g., periods of rest, watching television, using social media, etc.). Specific examples of physical activities may include, for example, physical tasks (e.g., sports, exercise, physically intensive labor) or a lack of physical activity (e.g., periods of rest, watching television, using social media, etc.).

In an example, S300 can include determining a brain age variability metric corresponding to variability of the brain age of the user over a period of time (e.g., using the brain age neural network). The period of time may be, for example, a day, a week, a month, a year, and/or any other suitable period of time. The brain age variability metric can optionally be based at least partially on a distribution of the brain age of the user over one or more periods of time.

In an example, S300 can include determining one or more downstream outputs based at least partially on one or more of: the brain age (e.g., via the brain age network), the brain age variability metric, the distribution of the brain age of the user (e.g., a flat distribution versus a wide or variable distribution), and/or demographic information of the user. Specific examples of demographic information may include age, gender, sex, race, whether the user lives in a developed or developing country, brain health, brain diseases and/or mental disorders, medication, education level, biome, environmental factors, toxins, weather, culture, ancestry, and/or any other demographic information. Downstream outputs can include: physiological indicators of the user, personality metrics (e.g., introversion, extroversion, sensing, intuition, thinking, feeling, judging, perceiving, etc.), attention metrics (e.g., magnitude of attention, duration of attention, etc.), and/or any other biomarker values. S300 can optionally include correlating one or more of the attention metrics with one or more attention factors, such as adrenaline levels of the user, interest levels of the user, external stimuli sensed by the user, environment of the user, and/or any other information.

In example embodiments, S300 can include performing a reinforcement learning function to determine activities performed by the user that tend to change the predicted brain age of the user. For example, S300 can include determining outputs of the reinforcement learning function, such as those activities that may increase or decrease the brain age of the user and engage the user in activities that may materially change (e.g., by minutes, hours, days, years, etc.) the brain age of the user. In example embodiments, S300 can include presenting the user with stimuli (e.g., puzzles, games, etc.) that elicit a different state in the user and may raise and/or lower the brain age of the user.

In example embodiments, S300 can include correlating the brain age of the user with a time, such as time of day and/or day of the week. For example, it may be determined that a relatively higher than average brain age for the user at 11:00 PM differs from a relatively higher than average brain age for the user at 5:00 PM and/or 9:00 AM.

In example embodiments, S300 can include creating, providing, maintaining, and/or facilitating an attentional network. With modern exposure, the human brain is hardwired to pay attention to threats in the wild, such as things that are moving fast, changing lights, flashing screens, and/or other threats. The threats may strain users' attentional networks because the user may be hardwired to pay attention to them, and so it may keep some users' brain age at a relatively high level of stress. In example embodiments, S300 can include analyzing the interplay between the attentional network depletion as well as the restorative time in nature. In a specific example, when a user may be spending time in natural environments, there may be studies conducted in prison environments as well where a person who has been deprived in a supermax cell, if you actually expose them to nature, they become relatively more calm and they become less agitated. The threats or perceived threats, which have an impact on the human brain, may also have an impact on brain age.

In example embodiments, biosignal data collection for training the brain age biomarker model can include studies involving eyes open vs eyes closed (e.g., with improving performance and statistical power over existing studies). For example, some studies may involve users' sessions where peak alpha-wave frequency vs. subject age during eyes-open and eyes-closed resting states may be correlated. This can optionally be used to determine a statistically significant decline in peak alpha frequency with age (e.g., 0.00 Hz per year).

However, the biomarker value can be otherwise determined.

5.5. Training a Model S400

The method can optionally include training a model S400, which functions to train the input model, the representation model, the biomarker model, the segmentation model, and/or any other model used in the method. In a specific example, S400 can function to learn the latent space for the input representation and/or the latent space for the brain state representation. In another specific example, S400 can function to learn the segmentation for the brain state representation (e.g., as described in S200). S400 can be performed after one or more iterations of S100 (e.g., where the biosignal data is training biosignal data), before one or more iterations of S100 (e.g., before new biosignal data is collected for model inference), before S200, before S300, and/or at any other time.

One or more models can be trained: individually, end-to-end, in parallel, sequentially, and/or at any other time. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. In a specific example, models can be trained using adversarial training, non-adversarial training (e.g., beneficial training), and/or a combination thereof.

Models can be trained on biosignal data across multiple users, biosignal data for an individual user (e.g., models can be fine-tuned using biosignal data collected with a specific user), biosignal data collected using different biosignal devices, biosignal data collected using a single biosignal device, and/or any other training biosignal data. The models can be learned or trained on: labeled data (e.g., biosignal data labeled with the target label), unlabeled data, positive training sets (e.g., a set of biosignal data with true positive labels), negative training sets (e.g., a set of biosignal data with true negative labels), and/or any other suitable set of data. For example, the models can be trained using training biosignal data that includes biosignal data labeled with a biomarker value (e.g., a benchmark). The label (e.g., biomarker value) can be: manually determined, user-determined (e.g., self-reported), retrieved from a database (e.g., a neurological condition retrieved from a user database), determined based on a stimulus (e.g., for a user reading text, the text is the label), predetermined, and/or otherwise determined. In a specific example, the training data can include biomarker-specific training data (e.g., a "benchmark" study), where the biosignal data is labeled with a biomarker value corresponding to a specific biomarker (e.g., benchmark). Specific examples of biomarkers (e.g., benchmarks) for training can include: eyes open/eyes closed, cognitive dissonance (e.g., where the user sees the word "red", but the font color is actually color blue, where the user is tasked with selecting a button to match the font color), Ready Set Go, image classification, age, demographic, and/or any other biomarker.

Training a model can include: determining a loss based on a target determined using the model, and training the model based on the loss. In a first example, the target can be a predicted biomarker value (e.g., as described in S300), wherein the loss can be determined by comparing the predicted biomarker value to the label (e.g., as described above). In a second example, the target can be reproduction of the biosignal data (e.g., decoded from the brain state representation), wherein the loss can be determined by comparing the reproduction of the biosignal data to the biosignal data (e.g., processed and/or processed biosignal data). In a third example, the target can be a representation. In a specific example, the loss can be determined by comparing masked and unmasked versions of input data (e.g., biosignal data and/or an input representation), where the model attempts to reconstruct the representation layer for the masked input data (e.g., using contextual information from surrounding segments of the input data).

In variants, one or more models (e.g., the representation model, a segmentation model, etc.) can be trained using adversarial training (e.g., training to maximize a loss between and a training label and the model's output based on an adversarial input), non-adversarial training (e.g., training to minimize a loss between a training label and the model's output from a beneficial input), and/or a combination thereof. In a specific example, the model undergoing training can be a representation model, wherein the representation model directly outputs a segmented brain state representation (e.g., a segmented training embedding). In a second specific example, the model undergoing training can be a representation model and/or a segmentation model, wherein the representation model outputs a brain state representation (e.g., a training embedding), and a segmentation model segments the output brain state representation.

In a first embodiment, training using non-adversarial training (e.g., beneficial training) can include: transforming training biosignal data into a brain state representation (e.g., a training embedding), wherein the brain state representation is segmented into a beneficial segment and a non-beneficial segment; and training a model (e.g., a representation model and/or a segmentation model) via non-adversarial training using all or a portion of the beneficial segment. In an example, training using non-adversarial training can include: using a model (e.g., a representation model and/or a segmentation model), determining a segmented brain state representation from a set of training biosignal data (labeled with a training label), wherein the brain state representation segments include a beneficial segment and one or more non-beneficial segments (e.g., adversarial segment, neutral segment, etc.); passing all or a portion of the beneficial segment (e.g., the entire beneficial segment and/or a biomarker-specific segment of the beneficial segment) to the biomarker model to predict a biomarker value, and training the model (e.g., the representation model and/or the segmentation model) by minimizing a loss between the predicted biomarker value and the training label.

In a second embodiment, training using adversarial training can include: transforming training biosignal data into a brain state representation (e.g., a training embedding), wherein the brain state representation is segmented into a beneficial segment and a non-beneficial segment (e.g., adversarial segment, neutral segment, etc.); and training a model (e.g., a representation model and/or a segmentation model) via adversarial training using all or a portion of the non-beneficial segment. In an example, training using adversarial training can include: determining a segmented brain state representation from a set of training biosignal data (labeled with a training label) using a model (e.g., a representation model and/or a segmentation model), wherein the brain state representation segments include a beneficial segment and one or more non-beneficial segments (e.g., adversarial segment, neutral segment, etc.); passing all or a portion of the non-beneficial segments (e.g., the adversarial segment) to the biomarker model to predict a biomarker value, and training the model (e.g., the representation model and/or the segmentation model) by maximizing a loss between the predicted biomarker value and the training label. Adversarial training can optionally be performed using Generative Adversarial Networks (GAN) and/or other adversarial training methods.

Figure 5:
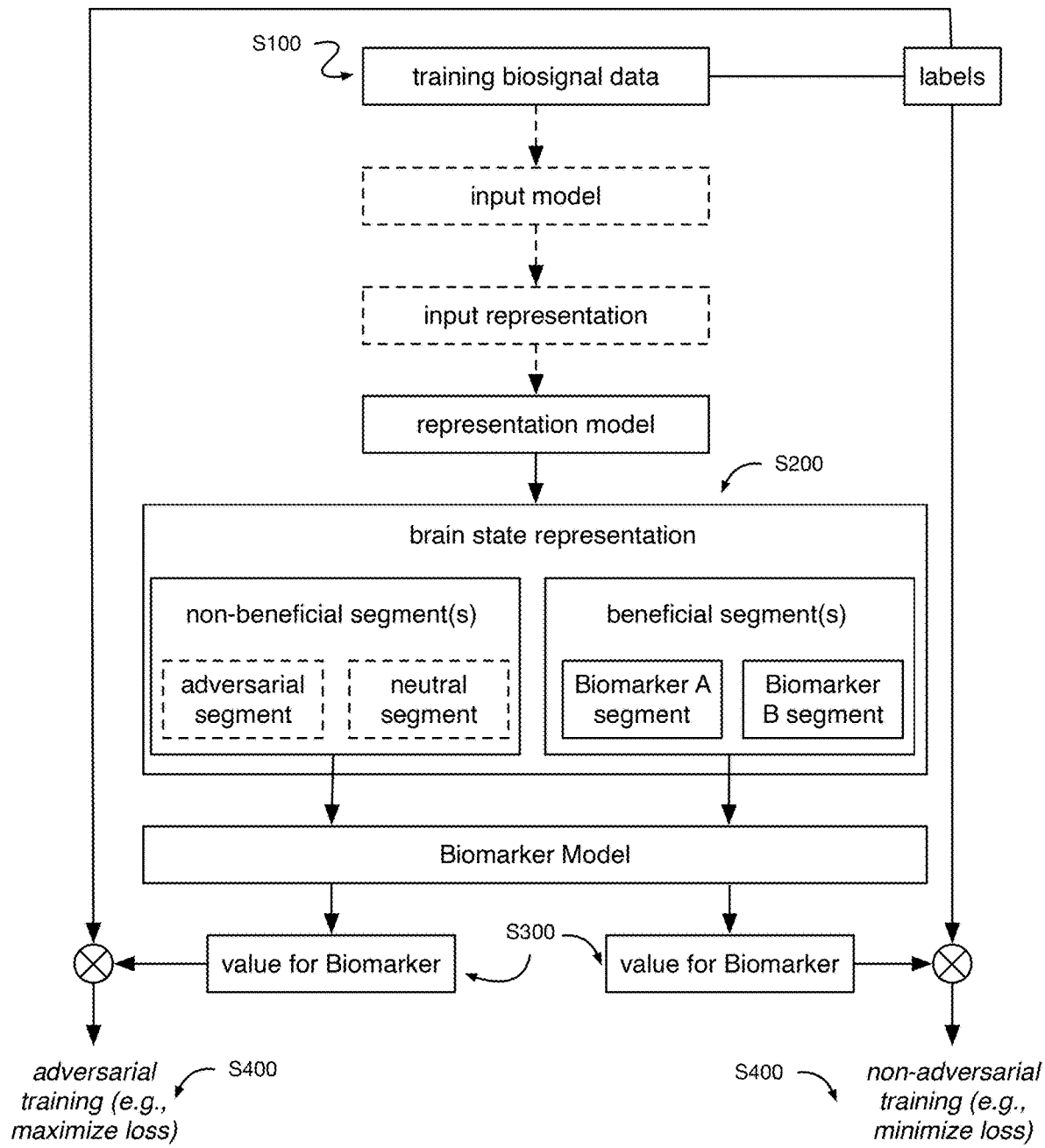
FIG. 5 depicts an example of the method, including model training.
Figure 9:
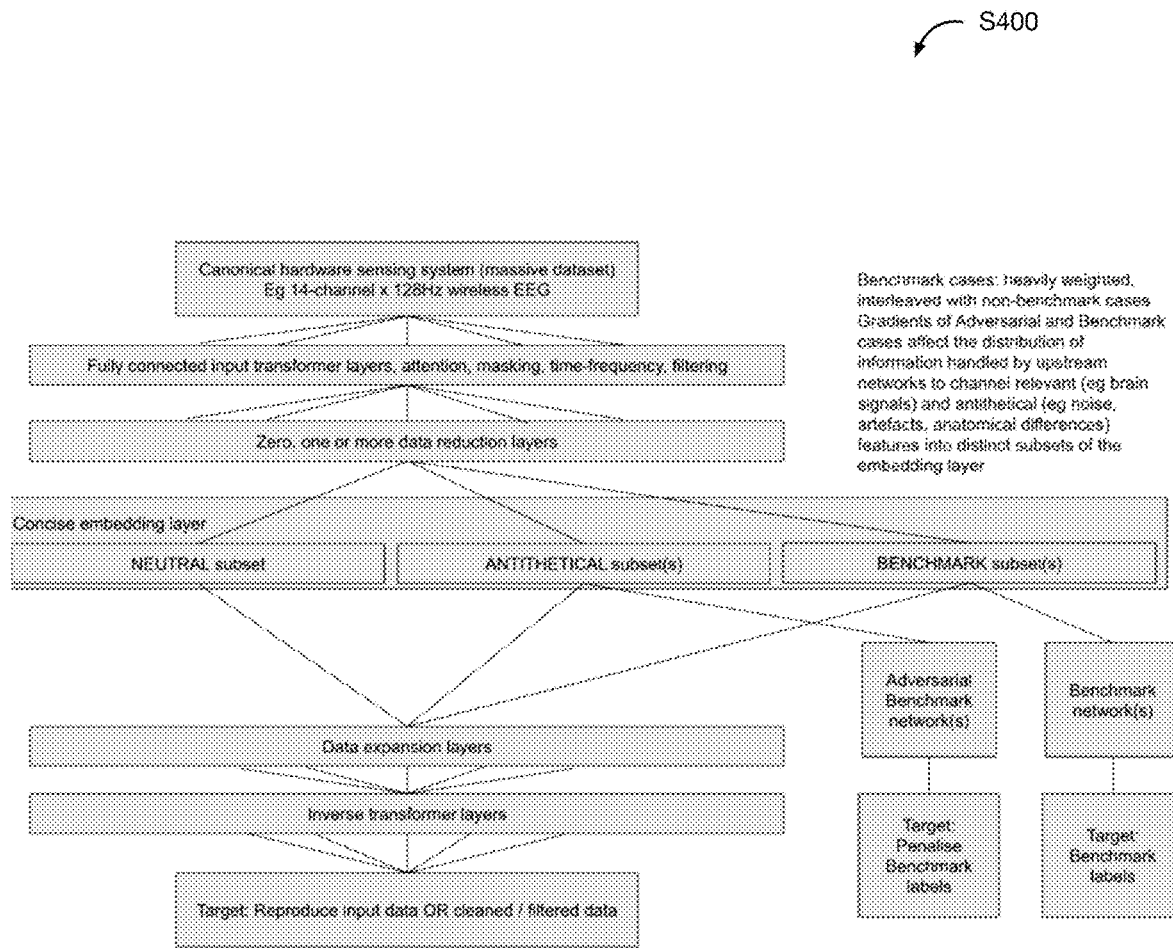
FIG. 9 depicts an illustrative example of brain state representation segmentation using beneficial and adversarial training.

In a third embodiment, a combination of the first and second embodiments can be used. Examples are shown in FIG. 5 and FIG. 9. For example, the model can be trained using adversarial and non-adversarial training methods in parallel. In an example, the overall loss function can include a term that is minimized over a beneficial segment and maximized over a non-beneficial segment. In an example, the overall loss function of the representation model can include a component (e.g., a term) which decreases the loss for a correct determination of a value (e.g., classification) for a first biomarker based on the beneficial segment, but increases the loss (e.g., reversed in sign) for a correct determination of the value for the first biomarker based on the complementary segment of the output representation (e.g., the remaining portion of the output representation). In a specific example, the overall loss function of the representation model can further include a second component (e.g., an additional term) which decreases the loss for correct determination of a value (e.g., classification) of a second biomarker based on a second beneficial segment (e.g., wherein the second beneficial segment may or may not overlap with the first beneficial segment), and increases the loss for correct determination of the value of the second biomarker based on the complementary segment to the second beneficial segment (e.g., the remaining portion of the output representation). Training the representation model can optionally include holding the first beneficial segment fixed, and iteratively searching to find the optimal overlapping length and non-overlapping length of the second beneficial segment over the first beneficial segment.

In a specific example, the method can use model training methods as described in: Navid Mohammadi Foumani, Geoffrey Mackellar, Soheila Ghane, Saad Irtza, Nam Nguyen, and Mahsa Salehi. 2024. EEG2Rep: Enhancing Self-supervised EEG Representation Through Informative Masked Inputs. In Proceedings of the 30th ACM SIGKDD Conference on Knowledge Discovery and Data Mining (KDD '24). Association for Computing Machinery, New York, NY, USA, 5544-5555. https://doi.org/10.1145/3637528.3671600, which is incorporated in its entirety by this reference.

In variants, S400 can include joint training of the representation model and a second model (e.g., a foundation model such as a large language model, an image model, etc.). For example, the output representation of the representation model can be converted to a biomarker value using a generative model (e.g., thought to text, thought to image, thought to any multimodal representation, etc.), wherein the representation model and the generative model can be jointly trained.

However, one or more models can be otherwise trained

6. Specific Examples

Figure 7:
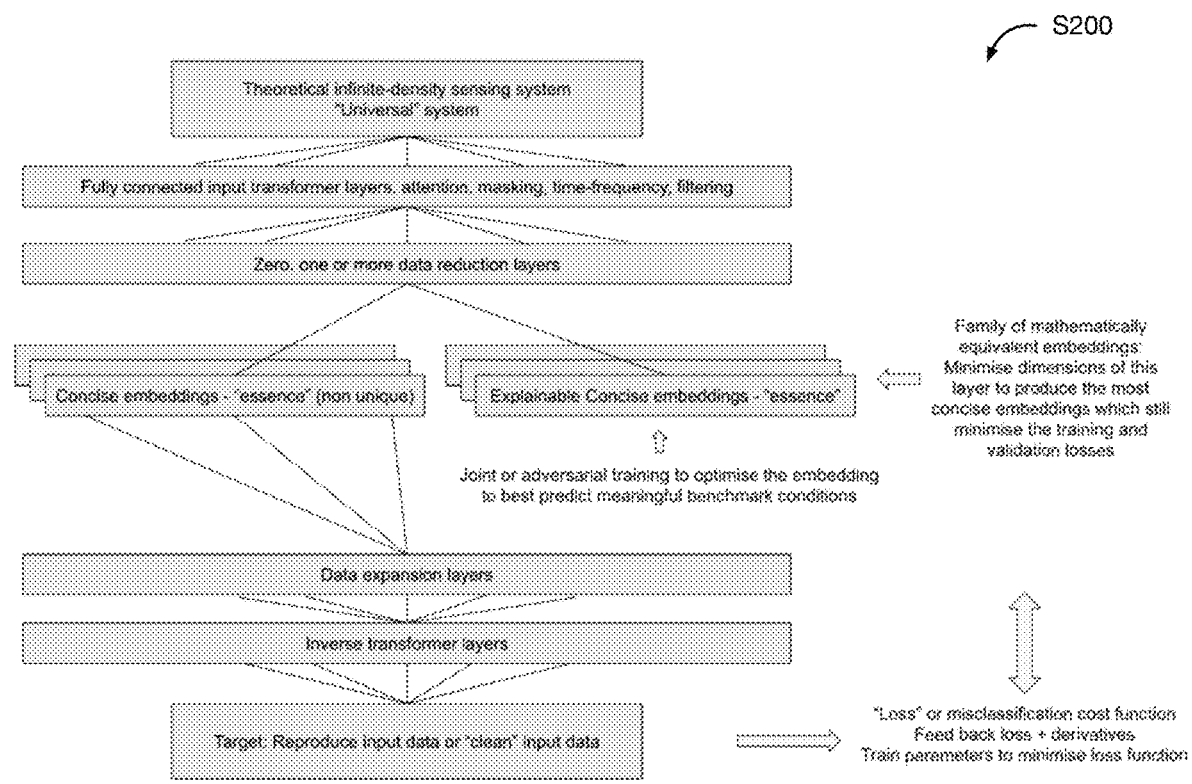
FIG. 7 depicts an illustrative example of "Universal" embeddings based on theoretically perfect information.

In an illustrative example (e.g., as shown in FIG. 7), one can assume the existence of a class of mathematically equivalent "Universal" embeddings, each of which concisely captures the essence of all observable neurological states (e.g., mental states, mental operations, mental functions, etc.) within an idealized human brain (e.g., an underlying "Universal" brain). In an illustrative example, these Universal embeddings could arise from a theoretical near-infinite-density sensor system with sufficient resolution to capture all possible information which may be derived from the Universal brain in operation across all possible states and configurations. In variants, a Universal Model can be estimated via a representation model.

In variants, each Universal embedding is assumed to represent fully idealized brain operation, absent any noise sources and intrinsic non-brain signals, distortions introduced by anatomical differences between subjects (e.g., skull thickness, cortical folding and orientation, physical arrangement of functional regions and connectivity, cultural, educational, physical and psychological development, psychological phenotype, abnormalities such as scarring from traumatic injury), within-subject effects (e.g., mental and psychological state, mood, fatigue, sleep deficit, onset of and/or recovery from injury and illness, nutrition, medications, normal development and aging, acquiring new skills, external life events, diurnal, seasonal and hormonal variations), and/or variations related to the biosignal device 100 (e.g., channel count, sensor positioning, placement of the biosignal device, state of the biosignal device, etc.). In a specific example, for a given biosignal device 100 (e.g., a 'standard' or canonical EEG headset), variations can include differences in precise physical sensor placement between different sessions, resulting local anatomical factors (e.g., arteries sometimes under sensors), unit-to-unit tolerance variation, temperature-sensitivity of precise calibration (e.g., calibration of voltage and sample rate), quality and/or impedance of each sensor contact onto the skin surface (hydration, skin condition, cleanliness and density of hair), physical location and proximity to extraneous noise sources, wireless quality, physical activity, muscle, and/or other intrinsic artefacts which may arise in different data collection sessions.

In variants, each Universal Model characterizes the operation of the idealized Universal Brain in all possible states and conditions. For example, the application of any real-world sensing technology to any individual is assumed to measure aspects of the idealized Universal Brain as characterized by a Universal model, where the Universal Model features are estimated after passing through a series of filters, distortions and obscuration related to anatomical, developmental and psychological differences between individuals, longitudinal changes within individuals, extraneous and intrinsic noise sources and the physical limitations of the specific measuring instrument. In an example, considering the case of electromagnetic signals arising from the operation of neural pathways (EEG, MEG, etc.), these limitations can arise from the finite density of sensing locations, the relative placement of sensing locations relative to each other and specific anatomical features, sensing resolution (e.g., voltage resolution, bit depth), sampling frequency, bandwidth, impulse response and phase variations, local impedance variations (hair, skull thickness, hydration etc.), and/or sensitivity to contact impedance or other physical impediments.

In example embodiments, the underlying "Universal" model is assumed to be approximated by models derived from finite subsets of sensor configurations and combination of measurement techniques. The accuracy and utility of these approximations can be determined by the scale, diversity and quality of datasets collected using specific sensing configurations.

Figure 8:
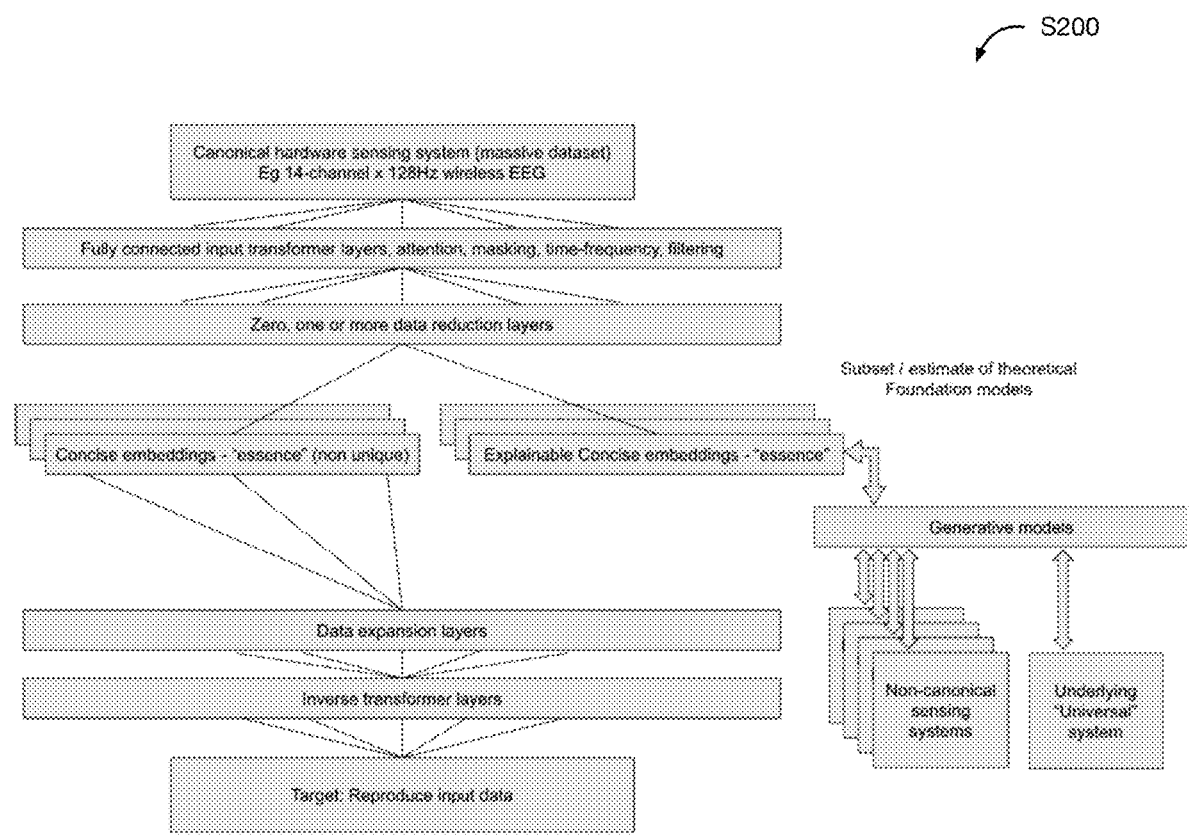
FIG. 8 depicts an illustrative example of "Canonical" Embeddings based on a corpus of measured data from the same biosignal device (or nearly identical biosignal devices).

In variants, one or more "Canonical" embeddings can be used to approximate the "Universal" embeddings. An example is shown in FIG. 8. In example embodiments, "canonical" form here can imply a specific sensing configuration (EEG or equivalent, and/or other sensing modalities, see above) for which a large corpus of data has been collected, which can be used to generate a family of "Canonical" embeddings which capture the essence of all observed mental states and mental operations/functions within that data set (whether labelled or unlabeled). Each possible embedding estimates activity in an underlying Universal brain model and serves to isolate signals emitted by distributed brain activity, from noise sources and distortions introduced by anatomical differences between subjects (e.g., skull thickness, cortical folding and orientation, physical arrangement of functional regions and connectivity, cultural, educational, physical and psychological development, psychological phenotype, abnormalities such as scarring from traumatic injury), within subjects (e.g., mental and psychological state, mood, fatigue, sleep deficit, injury and illness, nutrition, medications, normal development and aging, acquiring new skills, external life events, hormonal variations), and/or variations related to placement and state of the biosignal device 100 (e.g., for the 'standard' or canonical EEG headset this would include differences in precise physical placement between sessions and local anatomy (eg arteries sometimes under sensors), unit-to-unit and temperature-sensitive variation of precise calibration of voltage and sample rate, instrumental transfer function, quality and impedance of each sensor contact onto the skin surface (hydration, skin condition), physical location and proximity to extraneous noise sources, wireless quality, physical activity, muscle artefacts which may arise in different activities and so on).

In example embodiments, where a sufficiently large corpus of biosignal data has been collected for a single "Canonical" sensor configuration, it is assumed that we can approach the best possible approximation of an underlying Universal model that can be obtained for the Canonical equipment.

In example embodiments, the concepts herein can optionally describe a means whereby data collected using different sensing parameters and configurations may be converted to and from the "Canonical" sensing form (e.g., the brain state representation), for which highly accurate models may have been or could be generated. These conversions may be obtained using generative models, reductive models, and/or other means.

In one embodiment, predictive algorithms designed for the Canonical configuration may be converted to other sensor formats and refined using transfer learning and other methods. In another embodiment, an intermediate embedding includes a string of tokens generated by the canonical equipment while an analogous string of tokens is generated using other equipment. The learning task can involve translating the token strings into a common space, analogous to the operation of large language models. Synthetic Canonical data may thus be generated from data collected using other sensor configurations and densities, best approximating data that would have emanated from the Canonical equipment, and by inference, best approximating a Universal Foundational model. If of sufficient quality, this synthetic data may be added to the Canonical corpus, allowing us to improve the Canonical models which estimate a Universal model. By extension, the method can allow us to transform models developed using any sensor configuration (including the Canonical configuration) into any other, by generative means or otherwise, and/or to broaden the available training set of biosignal data to include data from a much wider range of sources.

In example embodiments, a biosignal device 100 may be configured to collect EEG data from one or more channels. The collected EEG data may be considered as a non-canonical form of the EEG data with respect to relative needs (e.g., number and locations of EEG sensing points, sampling frequency, etc.) for EEG analysis. The EEG system and models may also be configured to convert the non-canonical form of EEG data to a canonical form of the EEG data for EEG analysis. In example embodiments, what is defined as the canonical form of EEG data may vary from use case to use case depending on various technical reasons relating to a type of analysis being conducted on the EEG data. The applicable definition of canonical EEG data may impact the number of channels that may be sufficient for representing EEG data as being considered in the canonical form vs. non-canonical form (e.g., threshold of channels). For example, for one EEG analysis, a 12-channel EEG data representation may be sufficient to be considered canonical, whereas another EEG analysis may require a 14-channel EEG data representation to be considered canonical for that analysis. In other examples, the threshold for EEG data to be considered canonical may be a 64-channel EEG data representation for another example EEG analysis.

In example embodiments, a feature of a Canonical model can optionally be that there exists a sufficiently large corpus of biosignal data from a sufficient diversity of subjects, such that the Universal brain model (or a subset thereof, where sufficient information relevant to the specific application is contained therein) can be approximated with sufficient accuracy. A Canonical dataset can optionally be assumed to have sufficient cases to ensure that the resulting models have converged to within a small tolerance of the best possible estimate of the Universal model which can be achieved using the Canonical configuration. In examples, this Canonical model may or may not be expanded to include contributions from other equipment configurations where a common means of translation may exist.

In example embodiments, a biosignal device 100 may be configured to collect and capture EEG data via a limited set of channels (e.g., from a two-channel user device), with limited granularity (e.g., with longer time periods between sampling, shorter sessions, a substantially smaller number of sessions or the like), and/or via any other non-standard format (such as a differing number of channels than normally collected), any of which may be referred to as a "non-canonical" data format, and the non-canonical format may be converted and/or inferred using a generative and/or interpolative mapping or model to predict the Canonical EEG data (e.g., a 14-channel representation of EEG data or other standard representation as may be convenient for processing or other utilization of the EEG data).

In example embodiments, the conversion from a non-canonical form of EEG data (e.g., 2 channels) to a canonical form of EEG data (e.g., 14 channels) may be particularly valuable for a wide range of applications and use cases that benefit from EEG analysis. By virtue of conversion of EEG data (such as 2-channel data) from non-canonical to canonical form, such applications and use cases may take input from a user's brain and generate a useful result (such as an analysis of health, performance, or the like), even though the applications and use cases were trained to operate on canonical data. Conversion may allow an application to have the benefits of simplified, efficient, real-time capture of EEG data for an individual (such as in a 2-channel, wearable headset) and also the benefits of robust models that may be created over time using 14-channel data from a large population of individuals.

In other example embodiments, the biosignal device 100 may collect EEG data from N channels (where N may be four, five, or any other number) that may be in a non-canonical form for EEG analysis. The non-canonical form of EEG data can then optionally be converted to a canonical form of the EEG data as 14-channels. This may occur from mapping the N-channel EEG data to the 14-channel inferred EEG data, and/or by mapping to translatable token strings, as described in the disclosure.

In other example embodiments, EEG data can be collected from a 14-channel biosignal device (Canonical form) that may be converted or inferred as 64 channels of EEG data (non-canonical form), where specific use cases may require higher density recordings. In another example embodiment, the method and/or system may perform and/or facilitate a conversion from other non-canonical forms of EEG data (e.g., between 2 channels and 13 channels) to 14-channel inferred EEG data, which may be converted to 64-channel inferred EEG data, and/or other conversions, such as from low sample rate to high sample rate, or the like. In other example embodiments, any of these channels of EEG data can optionally be converted to a near-infrared inferred type of brain data, a magnetic inferred type of brain data, and/or other useful data representation of entities, states or flows of the brain or other subject of typical EEG data collection.

In another embodiment, a higher density EEG system (eg 32 or 64 channels) may be configured to collect data which may be converted to a (partially- or non-overlapping) Canonical 14-channel system for which high-accuracy mental state or disease models have been developed, permitting those models to be applied or refined using the higher density EEG data despite a lack of supporting data using the non-canonical equipment.

In example embodiments, a set of canonical representations may provide increasing spatial granularity with 14 channels, increasing time granularity (faster sample rates), or the like. In another example embodiment, a canonical representation may be provided with 64 channels, providing even more spatial granularity. In example embodiments, the conversion may allow for a deeper canonical representation with greater requirements to be parameterized. For example, assuming a set of non-canonical representations may feed from two channels for multiple types of devices and different kinds of environments, each one of these channels may be mapped into each of the canonical channels, such that non-canonical EEG data may be mapped to the canonical inferred EEG data representation.

Similarly to how images can be rescaled to work as better inputs for computer vision systems that are trained on particular scales of images, transformation of brain data from non-canonical data formats to canonical formats allows for a wide range of applications that have been trained to process biosignal data using canonical formats to make use of data collected in the non-canonical formats. In example embodiments, a 5-channel EEG device may be used for one example experiment relating to an analysis of brain states and/or emotions, such as excitement, frustration, meditation, engagement, valence, and/or focus. For example, this 5-channel EEG device may include 4 sensors in common with a Canonical 14 channel device, and one Pz sensor not present on the 14-channel device. Data detections developed for the Canonical device may be applied following transformation of the 5 EEG channels, allowing the non-canonical device to take advantage of the models developed using the Canonical configuration. In a specific example, in order to leverage existing 14-channel detections, a dataset of hours (e.g., many hours) of EEG data from subjects (e.g., 15 hours of data) may be used to derive a regression or interpolation model to predict 14 channels of EEG data from the available subset of 4 common channels via a machine learned model, applied to the Canonical data corpus. The machine-learned model may be deployed in a real-time system to synthesize 14-channel EEG data from the 5-channel data (and/or map both systems into a common representation), which may then be used as input to detection algorithms to provide real-time detections for the 5-channel device. In another example, MN8 2-channel system, a feasibility study may be conducted to ensure that sufficient information may be derived from two in-ear sensors. Same or similar Canonical datasets as described in the disclosure may be used and performance metrics for the entire 14-channel set may be generated. Then, the Canonical EEG data may be decimated to 2 channels (e.g., T7 and T8, adjacent to ear sensors) and predictive (e.g. regression) models may be built based on pre-processed spectral features relating only to T7 and T8 in order to predict EEG detections which may be derived for the proposed 2-channel device. In some examples, concordance of about 80% or greater may be achieved. A high level of concordance may be used to justify the cost of developing the proposed 2-channel system by substantially reducing the perceived risk that such detections may not be feasible for the proposed equipment.

However, the system and/or method can be otherwise used.

7. Use Cases

In variants, the system and/or method can be used to determine an intent of a user (e.g., a mental command) from biosignal data for initiating and/or executing one or more actions (e.g., actions in software and/or computer systems, robotic systems, user devices, displays, etc.). For example, biosignal data can be collected from a user while the user is thinking of mental commands. The mental commands can be determined (e.g., predicted, estimated, etc.) based on the biosignal data (e.g., via S200 and S300) and used to control one or more systems (e.g., software and/or computer systems, robotic systems, user devices, displays, etc.).

In example embodiments, an encoder (e.g., as described above) can provide a compact embedding of biosignal data as an input to a decoding model for determining a user's intent. In example embodiments, biosignal data (e.g., EEG data) may be collected from a user for analysis to determine the user's thoughts and intentions at any given period of time. These determinations may be used to initiate actions in software and/or computer systems. For example, when a user uses their mobile device, a system may be configured to measure a brain state of the user in parallel. In an example, when the user opens an application and/or logs into their laptop, the user's state may automatically launch related applications and/or perform other intent driven actions. In another example, the system may present to the user a menu of actions. The menu actions can optionally be prioritized based on what the system believes the user wants from model analyses. For example, the system may determine an association with actions such as turning on (e.g., activating) a flashlight, turning on a hotspot, listening to music from a third-party system (e.g., Spotify), and/or any other suitable actions. In a specific example, when the user performs these various actions, the system may immediately and continuously record brain states at those specific time frames. The system may train over time where, for example, every time the user may access their phone, the system may record and store a brain state as well as an associated action that took place. Thereby collecting a database of brain states and related actions that may be used to train a model, providing an association between brain state and actions that improves over time from continuous training. Then, over time, when the user acts, such as by answering their phone, the system may be able to anticipate the intent. The determination and/or association can optionally be generalized to the home, such as entering a home to activate actions with smart devices such that the system may automatically anticipate these intended actions and then automatically execute the actions via the smart devices. The system can optionally provide an extension to the user in order to execute various tasks throughout the day at home, at work, and/or at any other time.

In an example, the system and/or method may be utilized for audio control. For example, a user may have earbuds in their ears, and the user may think of the mental commands: play, pause, forward, back, and/or the like. Biosignal data collected for the user can be used to determine the mental commands (e.g., where the mental command is the biomarker value; as described in S300), wherein the determined mental commands can be used for audio control.

In example embodiments, the method and/or system may be configured to generally determine an intent of the user from the EEG data, which may be translated to an example application (e.g., skip a song, thoughts on images of a pattern, etc.). For example, a narrow granular exploration may inform broader categories, and the broader categories may inform the narrow categories in terms of intents. In a specific example, the system may execute a process that shifts from broad intent categories down to narrow intent categories and back up again depending on the user's intentions (e.g., broad to granular and back again for identifying themes).

In example embodiments, an end-to-end system and process may start with a collection process. For example, a user may wear a brain data collection device (e.g., earbuds for collecting EEG data). The user may be thinking about an intent to do some action. The system may be configured to process the EEG data received from the earbuds via up-resolution. In example embodiments, the system may employ a pre-trained relatively small machine learned model that may provide up resolution (e.g., up-channeler) locally (e.g., on the user's device). For example, the system may obtain and collect two-channel EEG signals over time (e.g., non-canonical data) and project the data or map the data to a 14-channel space as described in the disclosure. As a result, there may be an estimate of the user's 14-channel brain state.

In example embodiments, the system may analyze the continuously collected EEG data via various modeling processes for determining user intents, thoughts, and/or emotions. For example, the system may detect that there may be tracking points associating when the user may be in an emotional state, such as a "happy" state, as indicated by the EEG data. In example embodiments, the user may have other thoughts on intents and/or actions that may provide a ground truth signal. In other example embodiments, the user's thoughts or actions may indicate a "sad" state, an alert state, or pressing a button state. In other example embodiments, the user may have EEG patterns that may be different from the general population such that the 14-channel version of the model of their state may be skewed in ways that are particular to the user (and the user's associated brain group based on EEG signals).

In example embodiments, the system may utilize a fine-tuning model that may be used to normalize the collected EEG data. A unique user's 14-channel approximation may be converted into a truly canonical data form that may be a 14-channel representation and may be generalized for an entire population.

In example embodiments, the system may be configured to convert EEG signals from two-channel to 14-channel personalized and then from 14-channel personalized to 14-channel generic, and then 14-channel generic to a classifier of a use case specific class bar for a variety of actions (e.g., pause, play, forward, skip, and the like) that would be yet be determined from a model. In example embodiments, the EEG system may perform fine-tuning in an earlier stage or at a later stage for a correction. In some example embodiments, at least a portion of fine-tuning may be used to take the estimate or the inferred form of the user's 14-channel data to the canonical 14-channel data.

In example embodiments, the system may utilize a trained model to convert EEG data from two-channel form to 14-channel form. The model may have been trained over an entire population. For example, the model may be trained from people selected for studies collecting parallel recordings and may be performed in a lab or in a data collection domain. In example embodiments, data for the two to 14-channel mapper may be generic from testing several users. In example embodiments, there may be fine-tuning of one or more of these model(s) for one or more mental commands.

In example embodiments, the two to 14 channel conversion may relate to source separation. There may be activities throughout the brain that may be recorded in these two channels and the system may localize and analyze these brain activities. With a deep neural network, relatively complex processes may be implemented in contrast from relatively simple beam forming which allows the system to address various issues in the process simultaneously.

In example embodiments, initially there may be a source separation process. Then, in example embodiments, the brain may be adjusted for that 14-channel structure into a generic structure because the user's brain may be slightly different than other users' brains. In example embodiments, the process may include a conversion from 14 specific to the user EEG form to the 14 generic form. The system may utilize the 14 generic form in its preferred format for building various applications (e.g., user thinking of fast-forward or skip).

In example embodiments, original raw EEG data may be converted to the synthetic, projected 14 channel EEG data. In that projection, because it is a source separation, the projection may not be specific to a user's brain, but the conversion produced may be specific to the user's brain. The pre-trained model may be specific to the user's brain. The pre-trained model may be generic for all users because it may address/resolve a source separation problem. A pre-trained model may be used to produce what was happening at various localities in the brain. What happens in localities in the brain may be dramatically different for each user's brain such that there may be several different brain types for grouping users with these different brain types when modeling from EEG data specific to the user to generic EEG form.

In other example embodiments, a common latent space representation may be estimated, or analogous token strings may be generated and a translation learned, in order to develop a common model after translation.

As shown above, there may be two channels used at the collection device which may lead into a model (e.g., model A). In example embodiments, the 2-channel data input may be converted into 14 channel data from model A as described in the disclosure. There may be fine-tuning provided at different processes throughout the end-to-end system. In a next process, there may be another model (e.g., model B) that may use the inferred 14-channel data towards identifying at least one command (e.g., play, pause, etc.). In an example embodiment, the model B may provide some set of commands. The set of commands may include a prediction of a command and the system may provide some corrections in the form of feedback.

In example embodiments, there is a model C that may include fine-tuned commands. Model C may be a model that extends from users (e.g., user personal 14 channel data) and/or may be a local fine-tuned model. Model C may be trained by a population such as pre-trained over a relatively large population. In other examples, the model C may be locally fine-tuned to correct for local differences or personal differences for each particular person.

In example embodiments, there may be three processes involving models A, B, and C. Model A may be a pre-trained model over a population that may form from collecting data offline by doing parallel recordings of users wearing both 14 channel headsets and two channel headsets. The processes may provide an up channeler that results in model A. In example embodiments, model B may be an extension of model A.

In example embodiments of the system that may also use the same or similar models, an initial set of 14-channel EEG data may be generated (e.g., from converting 2-channel EEG data to 14-channel data). Then, the system may zero out the 2 channels (e.g., closest to ears of the user for EEG earbuds), reserving them as targets to learn. The system may train a model that maps 12 channels to the 2 removed channels.

In other similar alternative example embodiments, the system may simultaneously record 14-channel EEG data and 2-channel EEG data in parallel. The system may then train a model that maps the 14-channel EEG data to the 2-channel EEG data. Then, the system may obtain a many-to-few model and a relatively large amount of 14-channel EEG data, and then map the 14-channel EEG data to two predicted channels. This may output a relatively large corpus of 14-channel to 2-channel EEG data. The system may then use this corpus in the reverse direction such as to train a model that takes 2-channel EEG data that may be used to predict 14-channel EEG data. There may be an output of a resulting model that may be configured to estimate 14-channel EEG data from 2-channel EEG data for users.

In example embodiments, as shown in the above drawing, an overall process (e.g., using a system) may include four processes or subprocesses including process A, B, C, and D. The overall process starts at collection of EEG data from a user and results in a determination of a command/action intended by the user at a specific period of time.

At process A (e.g., an example of determining an input representation), EEG data may be converted from two channel form to 14 channel form (e.g., non-canonical to canonical). The model at process A may be trained by a relatively large number of users simultaneously. The system may perform and/or facilitate performance of the conversion offline with simultaneous data sets reported at process A (e.g., simultaneous coordination of both inputs from the wearable device at the same time).

At process B (e.g., an example of determining a brain state representation), the 14-channel data may be converted to a foundational model (or embedding model), herein referred to as model N. The model N may also be based on a relatively large population of people.

At process C (e.g., an example of determining a biomarker value), a model may be formed when the embedding model (or space) may be related to a fixed number of commands. The model may also be trained offline (e.g., curated data). For example, there may be lab runs or testing used during process C. For example, there may be experiments conducted where users may be asked to think about something or select play, pause, skip, etc. For example, asking users to use a music application while recording their state as they select play, pause, etc. Process C may involve data gathering and collection as training for producing this correction model between brain states (e.g., EEG data patterns) and commands.

At process D (e.g., an example of determining a biomarker value), a model may be formed based on transitioning from commands and other data (e.g., personal data) to commands. The model may be a fine-tuned model created locally. After fine-tuning, this model may eventually be used for identifying commands from the EEG data patterns.

In example embodiments, the system may be used to map a personal brain state based on a user's collected EEG data to a generic brain state. For example, converting 14-channel data to the embedded model N may be implemented (e.g., when the embedded model may be trained using collective benchmarks). The collective benchmarks may include a collection of benchmarks that may be utilized in training the models with known actions/intents for association with brain state patterns (e.g., EEG patterns). In example embodiments, there may be a multifaceted optimization function that may provide value to the system. Benchmarks may include eyes open/eyes closed as one optimization useful for functions that may be trained. Other benchmarks may include cognitive dissonance (e.g., see the word "red", but the font colour is actually color blue, select a button to match the font colour), Ready Set Go, image classification, age/demographic, etc. In summary, there may be training processes applied at process B from 14 to N and N to several different benchmarks. The training of 14 to N at process B becomes the foundational model that may be used for all of the processes of the system providing a mapping from a user's brain to a generic brain state optimized over an entire population. The mapping from a brain to a generic brain state may be an initial component of the trained network. In example embodiments, there is an auto associated first stage that may use a model that may be fine-tuned through the collective benchmarks as well.

Process B can optionally be the foundation for the entire system and process. There may be a bottleneck in there that when coupled with the benchmarks (from the collective benchmarks) provides an interesting result in terms of quality of models produced. The collective benchmarks may mean simultaneously running dozens of benchmarks over different modalities. Whether individual users are performing well or badly on the collective benchmarks may give a feedback signal to make corrections as well in this training process.

In example embodiments, as described in the disclosure and shown above, there may be an initial process of converting the 14-channel form to the embedded model (N) such as 14 to N then the embedding may be converted back to a 14-channel representation. There may be a first step training modality which may then establish an initial encoder. In summary, 14 to N to 14 may occur via the encoder and a decoder, and/or there may be a common (or translatable) encoding. The 14-channel to N to 14-channel process may result in the encoder/decoder or any other feasible architecture capable of producing a common representation. The encoder may be fixed in stage two. Stage two may include building of specific neural networks from the N where the 14 to N may be used as a fixed pre-filter. The system may relate N to, for example, eyes open/eyes closed, which may be via a separate network. For example, there may be an N associated with other emotions/thoughts such as relaxed, stressed, seeing red, seeing green, etc. There may be a conversion for N to any of these emotions/thoughts. Specific neural networks may be built to each of these tasks while the encoder may be fixed to support the process.

Then, at a next step, the encoder may be trained simultaneously (e.g., polishing step). The simultaneous training of the encoder may result in a polished encoder especially based on the system optimizing across all the benchmarks simultaneously. The polished encoder may provide improved quality over the original encoder because the original encoder may not have been tuned. The polished encoder may be polished specifically for any task. By training over multiple benchmarks, the encoder may be relatively more generic which may be useful for the system and related processes. Furthermore, the refined generic encoder can optionally be fine-tuned locally with appropriate feedback and test cases to improve accuracy for individual users. These refinements can optionally be propagated back to the original model, potentially generating a continuous sequence of improvements to the core model over time.

In example embodiments, the encoder (e.g., auto encoder) may have a general representation. For example, there may be an input space such as a 14-channel data structure by a number of seconds (e.g. 2 seconds) at about 128 hertz. In this example, 14 channels×128 samples per second multiplied by 2 seconds result in 3,584 individual samples. Furthermore the example embodiment may include frequency content and phase content (e.g. spectral power at 0.5 Hz intervals, with phase differences at each frequency between each EEG channel or inferred source, and the averaged phase). These calculations may correlate to inputs that exist.

In example embodiments, the method can include joint training using large language and/or image models. For example, mental representations can be converted into speech using generative models (e.g., thought to text, thought to image and/or other multimodal representations).

In example embodiments, the encoder may be a neural network onto itself. It may be a deep portion of a neural network. Internally, it may have several layers that may have complexity in terms of convolutional layers and max pooling as well as other portions in a language of deep learning. Embedding N may be projected to a dimension that may be smaller than the input or the output. The input and output dimensions may be about 3,800 samples in this example. Thus, the embedding N may be about thousand samples when compressed from the input. It may be an information bottleneck that may enforce and train the system to provide a successful reproduction. The input may be reproduced as output by compressing the data through a smaller channel, thereby resulting in implicit learning of the system. When massive quantities of data are inputted, the system may learn ways of compressing across an entire population. Thereby, the system may at least partially produce and/or train a learned encoder and decoder that is already configured to compress and uncompress.

In example embodiments, as shown above in the drawing, one or more benchmarks may be passed from the embedded N space to a benchmark (e.g., benchmark application or decoder). The passing of the one or more benchmarks via the benchmark application/decoder may be summarized as going from embedding N to a label. The label may be a variety of possibilities such as: age, demographic, are they having a seizure?, do they have Alzheimer's?, are they issuing commands (e.g., play, pause), etc. There may be data on each of the benchmarks in the collective benchmarks where the system may know how to project or how to take the embedding space from an encoder and map that into a class label that may be preferred, in order to classify a section of EEG that produced the embedding. The section of EEG that produced the embedding may be the benchmark. When the collective benchmarks may be used to give a performance signal to the training of the auto encoder, a relatively high-quality auto encoder and/or other architecture may be built and updated over time.

In example embodiments, various benchmark training methodologies may be applied to the system in order to generate high quality models for understanding user brain states from EEG data. At process D, as shown above in the drawing, there may be three steps in training. For example, there may be a first step of training the encoder by using a target output (e.g., using the auto encoder) as the input. Then, at step two, the encoder may be fixed and trained independently from the encoded space for each of the benchmark applications that may be preferred. Then, at step three, the fixed encoder may be retrained starting with a fixed point that it was initially, but may now be trained over all benchmarks simultaneously in a combined optimization function. The encoder itself may drift and rotate slightly so that it may be formed to work relatively well on known benchmarks that may be useful. These three steps may be combined providing interesting results from combining benchmarks that may be dominated by multiple benchmarks. Using autoencoders across a population with many benchmarks in this stage of the process may be particularly interesting.

In example embodiments, the collective benchmarks may involve creating a way of doing a global single optimization function, which may combine errors across everything, and the system may pass that back through. In another example, each user benchmark may have a contribution. When there may be an error, each user benchmark may be used to update weights in a relatively small way to limit errors. In summary, benchmarks may be combined and that error function may be passed through or each user benchmark may be run. The collective benchmarks may be generally defined as the system training across all benchmarks simultaneously. For example, with one input and 50 benchmarks, there may be 50 errors. These 50 errors may feed back to the embedding, to the raw space, and to that neural network through user networks which may not be shared.

In example embodiments, there may be a variety of error weighting functions. For example, there may be an application to declare an appropriate group of collective benchmarks. Benchmark(s) may be used with intentional commands and/or controls. Because there may be minimizing collective error across a set of benchmarks that may be intentional command-type benchmarks, there may be a different benchmark or group of benchmarks that may be relevant to brain age (e.g., where the brain's control of autonomous functions of the body such that the brain is in control but there is no intent). For example, there may be a determination of whether the brain may be controlling a heartbeat in rhythm at the right times of day, controlling breathing correctly, and the like. The system may tune selection of the benchmark from the collective benchmarks by application or use case. There may be additional fine tuning involving simultaneously training everything for a specific application. From generic, the system may refine over and over. Then, for example, when only brain age may be desired, a particular brain age type may be targeted (e.g., with related models) for one final polish trained through the entire network.

In example embodiments, benchmark datasets may be further utilized to segment a foundational embedding into subsets which are relevant to the mental activities and states encompassed by the Benchmarks, and other subsets containing unrelated information which includes incidental mental activities and states, anatomical and psychological differences between subjects, hardware and configuration differences, irrelevant biosignals (e.g., ocular, cardiac and muscular artifacts) and noise.

In variants of this method, prior to training an autoencoder or other model using mostly unlabeled data, the embedding layer can be split into one or more subsets arranged in Benchmark-related pairs (herein designated TARGET and NON-TARGET for clarity), where each TARGET subset is linked to a downstream network which is beneficially trained according to one or more (or all) Benchmark datasets as above, while the NON-TARGET subset is attached to a downstream network which is adversarially trained using the same group of Benchmark datasets.

In an example of the method (e.g., using an autoencoder as a concrete example; however any other model architecture which targets a concise embedding layer may be substituted), the entire embedding (union of all TARGET, NON-TARGET and (optionally) unrelated "NEUTRAL" subsets) is trained to reproduce the input data (or some desirable related data such as a noise-reduced version of the input data) by the usual means such as an autoencoder, using a large unlabeled dataset, to which has been added a set of Benchmark labelled datasets relevant to specific mental states, actions, health status or demographic features.

With respect to a Benchmark case, the input data can optionally be assumed to contain information in three categories—"beneficial", where the information is directly relevant to accurate classification of the TARGET labels, "counterproductive" (e.g., "adversarial"), where the information serves to obscure or otherwise inhibit the classification of the TARGET labels, and "irrelevant", where the information has no impact on the accuracy of classification of those specific TARGET labels. For example, it can be assumed that all 3 components may be present in any training example, and the different components may be separable to some extent in the embedding layer. An example of a counterproductive component may be an eyeblink artefact in EEG data, which significantly obscures brain signals by the addition of a 10-200× larger voltage signal within the raw input data across many channels. Many other kinds of counterproductive information are possible for any given TARGET set. Some kinds of information which are counterproductive or irrelevant to successful classification of one particular TARGET set may be beneficial, irrelevant or counterproductive in others.

When a training example from one of the related Benchmark sets is encountered, suitably weighted additional costs are allocated to mis-classifying the Benchmark cases through the TARGET subset and related network, while the adversarial paradigm for the NON-TARGET subset and network, rewards the accumulation of counterproductive information. Thus, relevant information will tend to be channeled into the TARGET subset and counterproductive information will tend to be channeled into the NON-TARGET subset. "Irrelevant" information will tend to be captured in either set or the remainder of the set (if TARGET and NON-TARGET are not complementary). The size of the TARGET set can be minimized to limit the amount of "irrelevant" information which it can capture.

While the overall autoencoder (or other architectural embodiment) derives a minimal set of relevant features in the encoding layer, the additional constraints arising from the successful performance of the TARGET classification network and the minimized performance of the NON-TARGET adversarial network serves to rearrange the encoding layer into subsets of meaningful features.

The adversarial NON-TARGET sets will tend to accumulate features which are counterproductive or unhelpful to the classification of the Benchmarks, while the TARGET sets will tend to accumulate features most relevant to successful classification of the target states. In this way, in a specific example, we would be able to select the relevant TARGET features from the embedding, which can produce more compact and more accurate representations of relevant brain activity.

In variants, the simultaneous or sequential application of this process to multiple benchmark datasets, where each subset of embedding features of each class (beneficial, counterproductive and irrelevant) for one TARGET set can be split into beneficial, counterproductive and irrelevant sets for a second (and subsequent) TARGET set. In this way, embedding features may be separated into maximally beneficial (useful for all desired TARGET classifications), maximally counterproductive (antithetical to successful classification of any desired TARGET set), maximally irrelevant, and a mixture of other categories. This categorisation can provide many opportunities to understand how the TARGET states interact and what features are detrimental to each desirable outcome, and may provide novel insights into fundamental neuroscience and human psychology, and provide a framework for deriving biomarkers for disease states.

Furthermore, in examples, we can use pre-trained embeddings in this form to refine future TARGET feature sets relevant to mental activities and states not previously included in the Benchmark sets, to adapt embeddings to new individuals or groups, to discover anomalous conditions which may relate to disorders or diseases, or to test hypotheses regarding processing systems within the brain which may use common systems to process different kinds of information. For example, we may be able to demonstrate the degree to which the NON-TARGET and TARGET subsets for one specific Benchmark state or activity (eg anxiety, mental load, reading), may contain information which is helpful for classification of a second Benchmark state or activity (eg fear, cognitive stress, watching television). We may then infer that the second Benchmark state or activity represents mental processing or activity which is accomplished not at all, partially or wholly independently from processing the first (TARGET) type of Benchmark state or activity.

This process may be used one or more embodiments, below:

Embodiment 1. All Benchmarks rolled into a single TARGET subset and a single complementary NON-TARGET subset. If the set of Benchmarks comprehensively covers measurable brain functions, the TARGET set will be a good representation of brain function and the NON-TARGET set will mostly include non-brain-related signals such as noise, artefacts, inter- and intra-subject variability and equipment variability. The NON-TARGET set may also capture brain-related signals which are antithetical to the chosen Benchmark states.

Embodiment 2. All Benchmarks rolled into a single TARGET subset, a single NON-TARGET subset, and a third "NEUTRAL" subset. If the set of Benchmarks comprehensively covers measurable brain functions, the TARGET set will be a good representation of brain function and the NON-TARGET set will mostly include non-brain-related signals such as noise, artefacts, inter- and intra-subject variability and equipment variability, and the NEUTRAL set will capture signals which are not relevant to the set of Benchmark activities and states (neither help nor hinder the chosen Benchmarks). This model provides an additional degree of freedom allowing non-relevant signals to be captured, concentrating relevant and antithetical information in the TARGET and NON-TARGET subsets.

Embodiment 3. The above, but the TARGET subset is split into further subsets relevant to sub-groups of "related" Benchmarks or individual Benchmarks. Relationships between different Benchmarks can be established by finding independent and dependent groupings of Benchmark-related subsets where combining subsets in particular ways enhances the performance of the combination of Benchmarks related to each of the combined subsets.

Embodiment 4. Benchmark states can optionally be treated as independent. For example, cascading sequence of subsets may be split out from each of the TARGET (beneficial or BENCHMARK)="T", NON-TARGET (counter-productive)="C" and NEUTRAL (irrelevant)="N" sets. For example, for Benchmark A we have 3 sets of embedding features: TA, CA and NA. Each of TA, CA and NA contains 3 subsets for Benchmark B. So for example, TA={TBta, CBta, NBta} and so on. Then the TARGET set tor benchmark B is TB={TBta, TBtc, TBtn} and so on. The relative sizes of each subset within each parent set can optionally further be optimized in order to produce the best joint model while providing maximal contrast between Benchmark A and Benchmark B.

Embodiment 5. More compact and efficient Benchmark-specific models can be built using only the TARGET subset of the embedding, since all the relevant information is concentrated in that subset. This can provide an opportunity to produce smaller TARGET-specific models which may be easier to deploy to edge devices.

In example embodiments, a deep neural network model may exist as a layer that may tend to flow in one direction. As a result, the deep neural network model may be split in half and considered as two models connected. For example, if the deep neural network model is F(X) with X being an input and F(X) being an output, the deep neural network model may also be a combination of G(X) and H(X) that may be coupled together such that X being is the input and then F(x) is the output. This is typical of neural networks (especially deep neural networks) where models may be split and layered and composed. The deep neural network may include the auto encoder having the encoding portion positioned at the front end of the neural network and the decoding portion may be positioned at the back end of the neural network. Thus, while training may occur with one model initially, it may be split in part into multiple portions that may be optimized.

In example embodiments, a first process may be a pre-training process applied to the input space, which may be the receiving of 14 channels over time. The system may project the 14-channel data to an embedding space as an attempt to move towards the original input. The output space may be considered a retrieve of the input space. The weights that may be used for training and the models may be localized (e.g., where the weights may be updated based on an error at the last stage). Both the encoder and the decoder may be trained simultaneously. The training encoder may be a standard auto encoder.

In example embodiments, at a second process, the encoder part of the model may be fixed and be used in trying to model the embedding space to produce the target signal (e.g., target labels), for example with the benchmarks. For example, there may be training of the decoder to transition from embedding to target signals. Then, the system may fine tune the entire end-to-end system by fixing a benchmark classifier.

In example embodiments, at a third process, the decoder may be fixed and then the encoder may be retrained or fine-tuned so that it may improve at encoding as a function of the benchmarks. This fine tuning may include an input to the embedding outputting target labels. Then, when the benchmarks may be met with approval, the system may fix any problems and retrain thereby providing further fine-fine tuning of the foundational model with the superior encoder at a fourth process such that an input to the embedding may output target labels. In example embodiments, at a fifth process, everything may be trained simultaneously.

In general, in example embodiments, the system and processes described in the disclosure may involve a breaking of the entire process into parts that may address various issues through iterations and polishing. The breaking into parts may be accomplished through a training of everything simultaneously (e.g., as run at the fifth process). The simultaneous training of components may be accomplished independently for each benchmark. All or a portion of the process may be iterative (e.g., where improvement may occur in terms of quality models at each iteration). By training everything simultaneously, quality issues may be solved simultaneously which may be applied to specific categories such as brain age, mental commands, etc. The simultaneous training may enable the system to incrementally build increasingly complicated deep learning models over time for EEG at scale. Applying the system and processes towards EEG at scale may be particularly interesting especially when applied to specific benchmarking areas. These particular benchmarks may provide specific feedback functions but also may be aggregated together as multiple benchmarks resulting in a model or models that may be utilized for multiple purposes of understanding. Weighing performance of these benchmarks differently for different types of benchmarks may be interesting. For example, with biomedical applications, there may be a suite of devices that may be focused on biomedical. The benchmark weighing may relate to brain health, disease diagnosis, and the like which may be weighted higher than mental commands. For example, being successful at processing mental commands may make a fine tune model less proficient at identifying health problems as the weighting may be different for these distinct objectives.

In example embodiments, there may be a meta process around benchmarking of benchmark selection and optimization that may provide a rendering of a mental framework in a domain that may be interesting. The meta process may be in addition to EEG at scale such that there may be scaling along with how benchmarking may occur.

In example embodiments, there may be personalized fine-tuning with details provided in the following example process. For example, a user may use a 2-channel device to collect 2-channel EEG data for an EEG system. The EEG system may use a pre-trained model for 2-channel to 14-channel up-channeling of the EEG data from 2-channel EEG data to 14-channel EEG data. The 14-channel data may then be used as input to other components or purposes (e.g., brain age or audio control uses). Then, the 14-channel data from the pre-trained model output of 14-channel EEG data may also be mapped back to 2-channel EEG data using a model (e.g., a similar model as described in the disclosure for providing this same type of conversion from 14-channel to 2-channel EEG data form). For example, this process may be used to get estimates of the original 2-channel EEG data from the 14-channel EEG data that may be provided as input to the model. The difference between the original 2-channel EEG data and the synthetic 2-channel EEG data (e.g., from the processes of converting 2-channel EEG to 14-channel EEG data and back to synthetic 2-channel EEG data) may be used to train a local model to capture unique properties of the user. These unique properties may be reflected in the differences in the EEG data.

In example embodiments, there may be a lifetime of a model that may have two phases. One is where it may be trained, and the other is where inference may happen and where it may be used. For example, the training stage may include the receiving of an input and a target output as well as an actual output. There may be a desire to change weights to make the real output closer to the target output. The changing of weights may be performed many times (e.g., billions of times) to provide training for the model. Inference or test mode may be when an input is given and an output is produced such that there may be no intention to retrain the weights where the model may be utilized. In example embodiments, there may be models that are trained offline well in advance, but the use of those models in the inferential mode or test mode may be local on the device itself. In some examples, the foundational model may be run in inferential mode (e.g., partially locally). Specifically, the 2 to 14 channel process A may be trained in the lab in advance but may also be run locally either on the device or on the device's local hardware. In some example embodiments, the 14 channel to the embedding model N process B may also be run locally at least partially as the entirety of the model may not be run locally. In examples, there may be some sparsification of the model that may be optimized for the user.

In example embodiments involving commands, the embedding space to the mental commands may also be pre-trained. The pre-training of the embedding space may be part of the extension layer of the application. For example, third party software exists with commands such as play/pause, like/dislike control, which may be executed in the model between the embedding space and mental commands. A portion of the model may be running locally that may be around fine-tuning based on its local performance. For example, the user may be thinking of one command and then affecting it and then the user may be immediately undoing it. Fine-tuning may be local to address these types of issues. Thus, the fine-tuning and application layer may be particularly useful for these models at stages utilizing local processes, such as stages involving the extensibility layer and the foundational model that may be run at least partially local for some example embodiments.

In example embodiments at a high-level view, there may be commands which may leverage a model that may be trained across the entire population (e.g., straight from the data to the command itself) which may be a deep network technique.

However, the system and/or method can be otherwise used.

As used herein, "substantially" or other words of approximation (e.g., "about," "approximately," etc.) can be within a predetermined error threshold or tolerance of a metric, component, or other reference (e.g., within +/−0.001%, +/−0.01%, +/−0.1%, +/−1%, +/−2%, +/−5%, +/−10%, +/−15%, +/−20%, +/−30%, any range or value therein, of a reference).

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, comprising
a headset comprising a set of electroencephalogram (EEG) sensors configured to receive a set of bioelectrical signals from a head of a user; and
a processing system communicatively connected to the headset, the processing system configured to:
using an encoder, transform the set of bioelectrical signals into an embedding, wherein the embedding is segmented into a set of embedding segments, each comprising a subset of positions within the embedding;

select a first embedding segment from the set of embedding segments based on a biomarker of interest and a mapping between the set of embedding segments and a set of biomarkers; and determine a value for the biomarker of interest based on the first embedding segment.

2. The system of claim 1, wherein the set of EEG sensors comprises a first number of EEG sensors, the system further comprising a second headset comprising a second set of EEG sensors configured to receive second set of bioelectrical signals from a head of a second user, the second set of EEG sensors comprising a second number of EEG sensors greater than the first number of EEG sensors, wherein the processing system is further configured to, using the encoder, transform the second set of bioelectrical signals into a second embedding, and determine a second value for the biomarker of interest based on a first embedding segment of the second embedding.

3. The system of claim 2, wherein the set of EEG sensors comprises an EEG sensor placed at a first location on the head of the user, wherein the second set of EEG sensors does not comprise an EEG sensor placed at the first location on the head of the second user.

4. The system of claim 3, wherein the second set of EEG sensors comprises an EEG sensor placed at a second location of the head of the second user, wherein the set of EEG sensors does not comprise an EEG sensor placed at the second location of the head of the user.

5. The system of claim 2, wherein transforming the set of bioelectrical signals into the embedding comprises:

using an initial encoder, transforming the set of bioelectrical signals into an initial embedding based on the first number of EEG sensors; and using the encoder, transforming the initial embedding into the embedding.

6. The system of claim 1, wherein the processing system is further configured to:

select a second embedding segment from the set of embedding segments based on a second biomarker of interest and the mapping between the set of embedding segments and the set of biomarkers; and determine a value for the second biomarker of interest based on the second embedding segment.

7. The system of claim 1, wherein the encoder comprises a trained foundation model.

8. The system of claim 1, wherein the encoder is trained using a set of training bioelectric signals, wherein training the encoder comprises:

using the encoder, transforming the set of training bioelectrical signals into a training embedding, wherein the training embedding is segmented into a beneficial embedding segment and a non-beneficial embedding segment;

training the encoder via adversarial training using the non-beneficial embedding segment; and training the encoder via beneficial training using the beneficial embedding segment.

9. The system of claim 1, further comprising an external device communicatively connected to the processing system, wherein the value for the biomarker of interest is used to control the external device, wherein the value for the biomarker of interest comprises a mental command from the user.

10. The system of claim 9, wherein the external device comprises a display.

11. A method, comprising:

collecting bioelectrical data from a head of a user using a headset comprising a set of electroencephalogram (EEG) sensors;

using an encoder, transforming the bioelectrical data into an embedding, wherein the embedding is segmented into a set of embedding segments, each comprising a different subset of positions within the embedding;

selecting a first embedding segment from the set of embedding segments based on a biomarker of interest and a mapping between the set of embedding segments and a set of biomarkers; and determining a value for the biomarker of interest based on the first embedding segment.

12. The method of claim 11, wherein the set of embedding segments comprises an adversarial embedding segment comprising noise from the bioelectrical data, and a beneficial embedding segment, wherein the first embedding segment is a subset of the beneficial embedding segment, wherein the mapping comprises a mapping of subsets of the beneficial embedding segment and the set of biomarkers.

13. The method of claim 12, further comprising:

selecting a second embedding segment from the set of embedding segments based on a second biomarker of interest and the mapping between the set of embedding segments and the set of biomarkers, wherein the second embedding segment comprises a second subset of the beneficial embedding segment; and determining a value for the second biomarker of interest based on the second embedding segment.

14. The method of claim 13, wherein the first embedding segment and the second embedding segment comprise overlapping subsets of the beneficial embedding segments.

15. The method of claim 11, further comprising training the encoder using a set of training bioelectric data, wherein training the encoder comprises:

using the encoder, transforming the training bioelectrical data into a training embedding, wherein the training embedding is segmented into a beneficial embedding segment and an adversarial embedding segment;

training the encoder via adversarial training using the adversarial embedding segment; and training the encoder via non-adversarial training using the beneficial embedding segment.

16. The method of claim 15, wherein the encoder is trained via adversarial training and via non-adversarial training in parallel.

17. The method of claim 11, wherein the set of EEG sensors comprises a first number of EEG sensors, the system further comprising a second headset comprising a second set of EEG sensors configured to receive second bioelectrical data from a head of a second user, the second set of EEG sensors comprising a second number of EEG sensors greater than the first number of EEG sensors, wherein the processing system is further configured to, using the encoder, transform the second bioelectrical data into a second embedding, and determine a second value for the biomarker of interest based on a first embedding segment of the second embedding.

18. The method of claim 17, wherein transforming the bioelectrical data into the embedding comprises:

using an initial encoder, transforming the bioelectrical data into an initial embedding based on the first number of EEG sensors; and using the encoder, transforming the initial embedding into the embedding.

19. The method of claim 11, wherein the encoder comprises a foundation model.

20. The method of claim 11, further comprising controlling an external device using the value for the biomarker of interest, wherein the value comprises a mental command from the user.

\* \* \* \* \*